(12) United States Patent
Farag

(10) Patent No.: US 12,549,302 B2
(45) Date of Patent: Feb. 10, 2026

(54) METHODS AND APPARATUS FOR SL POSITIONING REFERENCE SIGNALS SIGNALING STRUCTURE

(71) Applicant: Samsung Electronics Co., Ltd., Suwon-si (KR)

(72) Inventor: Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 18/188,374

(22) Filed: Mar. 22, 2023

(65) Prior Publication Data

US 2023/0318772 A1 Oct. 5, 2023

Related U.S. Application Data

(60) Provisional application No. 63/327,721, filed on Apr. 5, 2022.

(51) Int. Cl.
*H04L 5/00* (2006.01)
*H04L 27/00* (2006.01)
(Continued)

(52) U.S. Cl.
CPC ........ *H04L 5/0048* (2013.01); *H04L 27/0006* (2013.01); *H04W 64/003* (2013.01); *H04W 72/25* (2023.01)

(58) Field of Classification Search
CPC ...... G01S 1/042; G01S 1/0428; G01S 5/0072; G01S 5/0236; G01S 5/0289; G01S 5/0009; H04L 5/0051; H04L 5/0094; H04L 1/1812; H04L 2001/0097; H04L 5/0053; H04L 5/0048; H04L 5/0023; H04L 5/0055;
(Continued)

(56) References Cited

U.S. PATENT DOCUMENTS

2013/0316727 A1\* 11/2013 Edge ..................... H04W 76/14
455/456.1
2016/0286374 A1\* 9/2016 Baghel .................. H04W 24/10
(Continued)

FOREIGN PATENT DOCUMENTS

EP 4221033 A1 8/2023
WO 2020256311 A1 12/2020
(Continued)

OTHER PUBLICATIONS

"5G; NR; Physical channels and modulation (3GPP TS 38.211 version 17.4.0 Release 17)", ETSI TS 138 211 V17.4.0, Jan. 2023, 141 pages.
(Continued)

*Primary Examiner* — Nimesh Patel

(57) ABSTRACT

Methods and apparatuses for a sidelink (SL) positioning reference signal (PRS) signaling structure in a wireless communication system. A method of operating a user equipment (UE) includes transmitting, to another UE, a first SL PRS and a first SL control information associated with the first SL PRS and receiving, from the other UE, a second SL control information associated with a second SL PRS. The method further includes determining, based on the second SL control information, resources for the second SL PRS and receiving the second SL PRS on the determined resources.

16 Claims, 21 Drawing Sheets

(51) Int. Cl.
*H04W 64/00* (2009.01)
*H04W 72/25* (2023.01)

(58) Field of Classification Search
CPC ... H04L 5/0007; H04L 5/0098; H04L 27/261; H04L 1/0026; H04L 41/0894; H04L 5/006; H04L 41/0803; H04L 43/08; H04L 5/0037; H04W 92/18; H04W 64/00; H04W 72/0446; H04W 76/14; H04W 76/19; H04W 8/005; H04W 88/04; H04W 76/23; H04W 72/23; H04W 72/1268; H04W 72/21; H04W 72/20; H04W 48/16; H04W 72/542; H04W 60/04; H04W 8/24; H04W 88/14; H04W 72/04; H04W 72/25; H04W 36/00698; H04W 36/0094; H04W 72/54; H04W 72/543; H04W 92/02; H04W 92/16; H04W 72/563; H04W 72/535; H04W 16/18; H04W 68/12; H04W 72/02; H04W 52/0229; H04W 52/0245; H04W 28/0268; H04W 28/0236; H04W 28/0967; H04W 48/10; H04W 84/042; H04W 4/023; H04W 36/302; H04W 56/002; H04W 76/10; H04W 36/18; H04W 36/00833; H04W 36/144; H04W 36/03; H04W 72/00; H04B 7/0695; H04B 7/088; H04B 7/0626; H04B 17/318; H04B 7/0617; H04B 17/336; H04B 17/345; H04B 17/328; H04B 7/0632; H04B 7/06954; H04B 7/24; H04B 7/15507; H04B 7/0452; H04B 17/327; H04B 17/382; H04B 17/346; H04B 17/3913; Y02D 30/70; G06N 20/00; G06N 3/063; H04J 11/0056; H04J 11/0036; H04J 11/0053; H04J 11/005; H04J 13/004; H04J 11/0069; H04J 13/18; H04J 11/0079; H04J 11/0026; H04J 11/00; H04J 11/0059; H04J 11/0023; H04J 2011/0096

See application file for complete search history.

(56) References Cited

U.S. PATENT DOCUMENTS

| | | | | |
|---|---|---|---|---|
| 2018/0092027 | A1* | 3/2018 | Sheng | H04W 48/08 |
| 2019/0230618 | A1* | 7/2019 | Saur | H04W 56/001 |
| 2021/0297206 | A1 | 9/2021 | Manolakos et al. | |
| 2022/0015057 | A1* | 1/2022 | Bao | H04W 76/14 |
| 2022/0053422 | A1* | 2/2022 | Choi | H04W 48/10 |
| 2022/0361142 | A1 | 11/2022 | Ko et al. | |
| 2022/0365163 | A1 | 11/2022 | Baek et al. | |
| 2022/0397633 | A1 | 12/2022 | Baek et al. | |
| 2023/0062805 | A1 | 3/2023 | Baek et al. | |
| 2023/0076030 | A1* | 3/2023 | Baek | H04W 64/006 |
| 2023/0096178 | A1* | 3/2023 | Wu | H04W 72/51 |
| | | | | 370/329 |

FOREIGN PATENT DOCUMENTS

| | | |
|---|---|---|
| WO | 2021030583 A1 | 2/2021 |
| WO | 2021086114 A1 | 5/2021 |
| WO | 2021101182 A1 | 5/2021 |
| WO | 2021133104 A1 | 7/2021 |
| WO | 2021240479 A1 | 12/2021 |
| WO | 2022062891 A1 | 3/2022 |
| WO | 2023136572 A1 | 7/2023 |

OTHER PUBLICATIONS

"5G; NR; Multiplexing and channel coding (3GPP TS 38.212 version 17.4.0 Release 17)", ETSI TS 138 212 V17.4.0, Jan. 2023, 206 pages.

"5G; NR; Physical layer procedures for control (3GPP TS 38.213 version 17.4.0 Release 17)", ETSI TS 138 213 V17.4.0, Jan. 2023, 263 pages.

"5G; NR; Physical layer procedures for data (3GPP TS 38.214 version 17.4.0 Release 17)", ETSI TS 138 214 V17.4.0, Jan. 2023, 236 pages.

"5G; NR; Physical layer measurements (3GPP TS 38.215 version 17.2.0 Release 17)", ETSI TS 138 215 V17.2.0, Sep. 2022, 33 pages.

"5G; NR; Medium Access Control (MAC) protocol specification (3GPP TS 38.321 version 17.3.0 Release 17)", ETSI TS 138 321 V17.3.0, Jan. 2023, 254 pages.

"5G; NR; Radio Resource Control (RRC); Protocol specification (3GPP TS 38.331 version 17.3.0 Release 17)", ETSI TS 138 331 V17.3.0, Jan. 2023, 1295 pages.

"LTE; Evolved Universal Terrestrial Radio Access (E-UTRA); Physical layer procedures (3GPP TS 36.213 version 17.4.0 Release 17)", ETSI TS 136 213 V17.4.0, Jan. 2023, 568 pages.

"3rd Generation Partnership Project; Technical Specification Group Radio Access Network; Study on scenarios and requirements of in-coverage, partial coverage, and out-of-coverage NR positioning use cases (Release 17)", 3GPP TR 38.845 V17.0.0, Sep. 2021, 16 pages.

International Search Report and Written Opinion issued Jul. 12, 2023 regarding International Application No. PCT/KR2023/004614, 7 pages.

Extended European Search Report issued Jul. 8, 2025 regarding Application No. 23785001.1, 11 pages.

* cited by examiner (a)

(b)

(c)

(d)

(a)

(b)

(c)

(d)

(a)

1700
(b)

(c)

(d)

(a)                                                                               (b)

(c)                                                                              (d)

(a)                                                                               (b)

(c)                                                                               (d)

METHODS AND APPARATUS FOR SL POSITIONING REFERENCE SIGNALS SIGNALING STRUCTURE

CROSS-REFERENCE TO RELATED APPLICATIONS AND CLAIM OF PRIORITY

The present application claims priority to U.S. Provisional Patent Application No. 63/327,721, filed on Apr. 5, 2022. The contents of the above-identified patent document are incorporated herein by reference.

TECHNICAL FIELD

The present disclosure relates generally to wireless communication systems and, more specifically, the present disclosure relates to sidelink (SL) positioning reference signals (PRS) signaling structure for a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a SL PRSs signaling structure for a wireless communication system.

In one embodiment, a user equipment (UE) is provided. The UE includes a transceiver configured to transmit, to another UE, a first sidelink SL PRS and a first SL control information associated with the first SL PRS and receive, from the other UE, a second SL control information associated with a second SL PRS. The UE further includes a processor operably coupled to the transceiver. The processor is configured to determine, based on the second SL control information, resources for the second SL PRS. The transceiver is further configured to receive the second SL PRS on the determined resources.

In another embodiment, a method of operating a UE is provided. The method includes transmitting, to another UE, a first SL PRS and a first SL control information associated with the first SL PRS and receiving, from the other UE, a second SL control information associated with a second SL PRS. The method further includes determining, based on the second SL control information, resources for the second SL PRS and receiving the second SL PRS on the determined resources.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The term "module" means any device, system, or part thereof that controls at least one operation. Such a module may be implemented in hardware or a combination of hardware and software and/or firmware. The functionality associated with any particular module may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
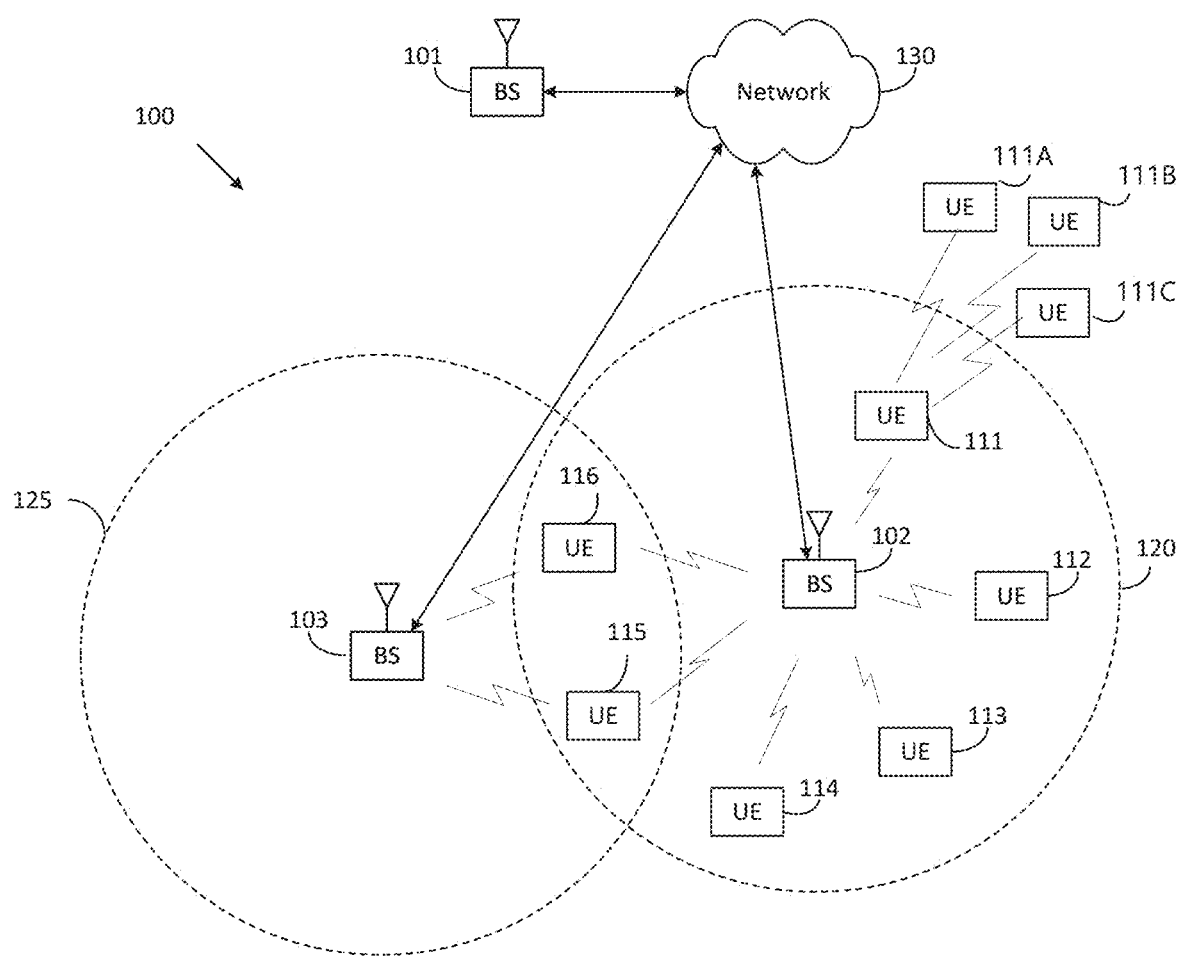
FIG. 1 illustrates an example of wireless network according to embodiments of the present disclosure.

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.4.0, "NR; Physical channels and modulation"; 3GPP TS 38.212 v17.4.0, "NR; Multiplexing and Channel coding"; 3GPP TS 38.213 v17.4.0, "NR; Physical Layer Procedures for Control"; 3GPP TS 38.214 v17.4.0, "NR; Physical Layer Procedures for Data"; 3GPP TS 38.215 v17.2.0, "NR; Physical Layer Measurements"; 3GPP TS 38.321 v17.3.0, "NR; Medium Access Control (MAC) protocol specification"; 3GPP TS 38.331 v17.3.0, "NR; Radio Resource Control (RRC) Protocol Specification"; 3GPP TS 36.213 v17.4.0, "Evolved Universal Terrestrial Radio Access (E-UTRA); Physical layer procedures", and 3GPP TR 38.845 v17.0.0, "Study on scenarios and requirements of in-coverage, partial coverage, and out-of-coverage NR positioning use cases."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
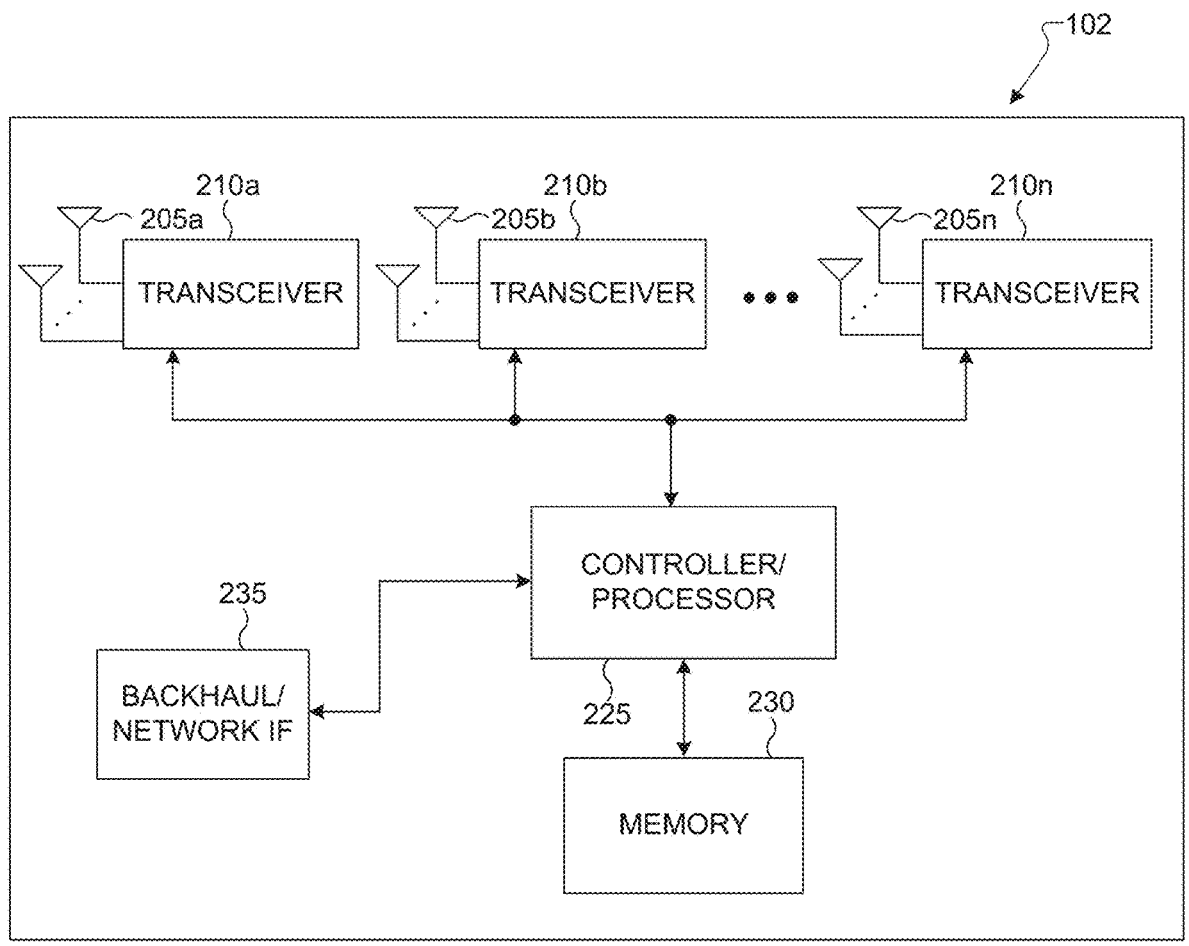
FIG. 2 illustrates an example of gNB according to embodiments of the present disclosure.
Figure 3:
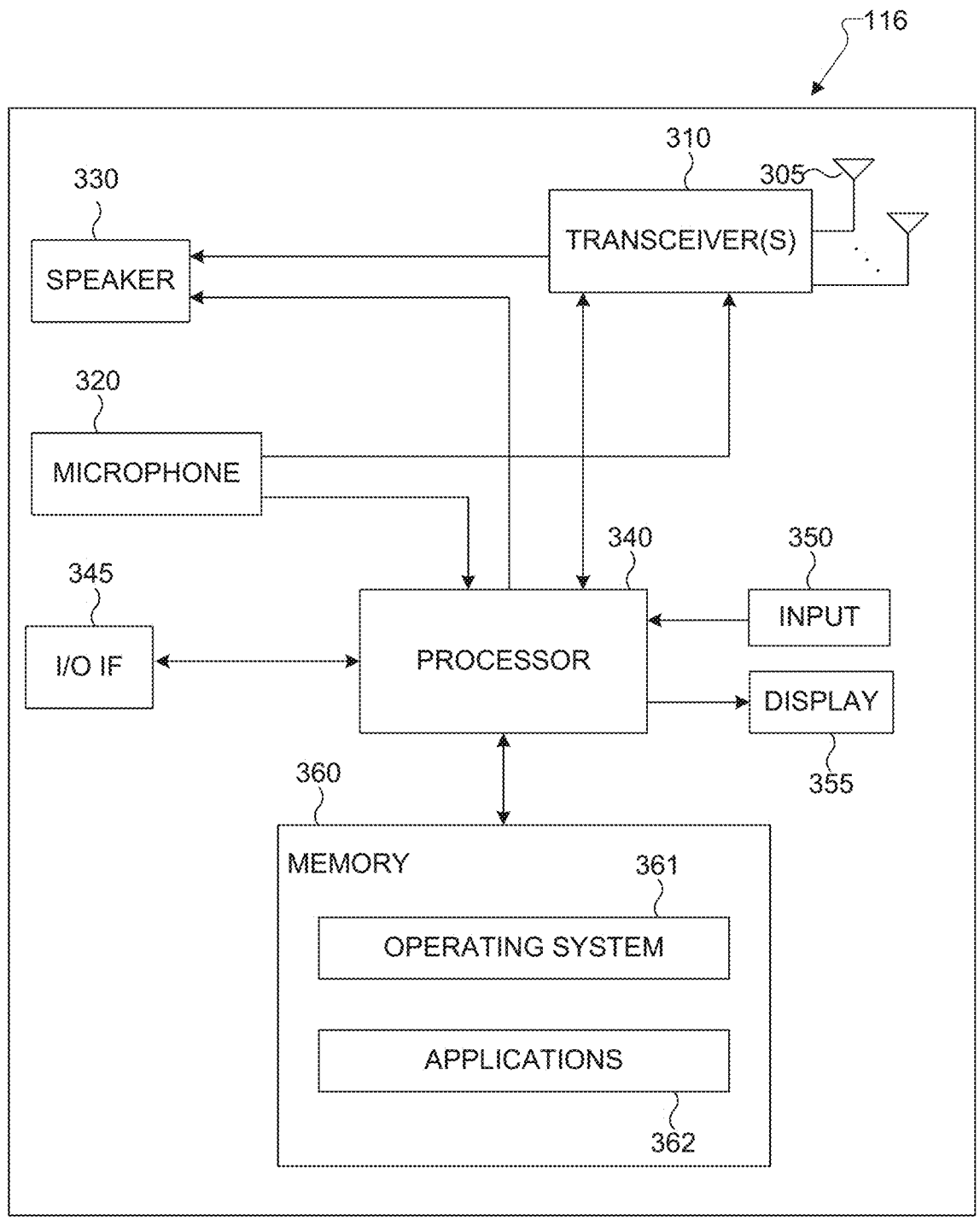
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UE are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for sending and/or receiving a signaling for a SL PRSs signaling structure in a wireless communication system. In certain embodiments, and one or more of the gNBs 101-103 includes circuitry, programing, or a combination thereof, to support a signaling for a SL PRSs signaling structure in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process. The controller/processor 225 is also capable of executing programs and other processes resident in the memory 230, such as processes for to provide or support a signaling for a SL positioning reference signals signaling structure in a wireless communication system.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL and/or SL channels and/or signals and the transmission of UL and/or SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a signaling for a SL positioning reference signals signaling structure in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
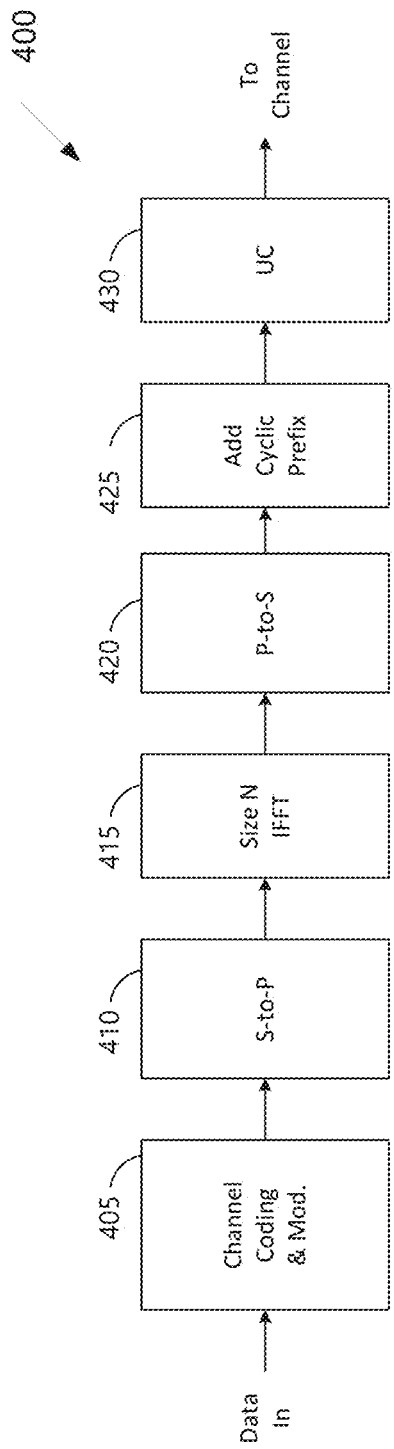
FIGS. 4 and 5 illustrate example of wireless transmit and receive paths according to the present disclosure.
Figure 5:
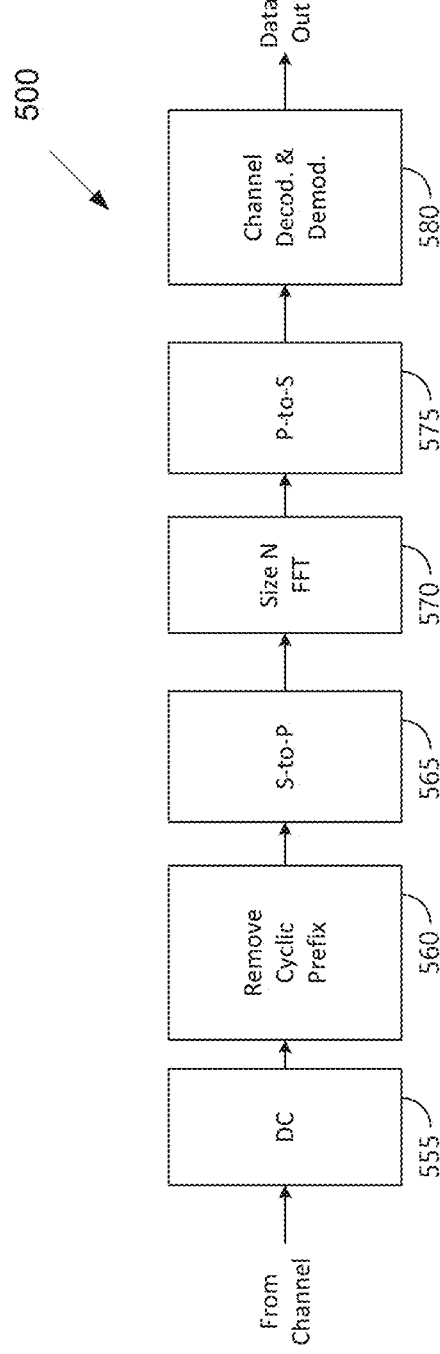

FIG. 4 and FIG. 5 illustrate example wireless transmit and receive paths according to the present disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. It may also be understood that the receive path 500 can be implemented in a first UE and that the transmit path 400 can be implemented in a second UE to support SL communications and/or SL positioning. In some embodiments, the receive path 500 is configured to support a signaling for a SL positioning reference signals signaling structure in a wireless communication system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116. A transmitted RF signal from a first UE arrives at a second UE after passing through the wireless channel, and reverse operations to those at the first UE are performed at the second UE.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and/or transmitting in the sidelink to another UE and may implement the receive path 500 for receiving in the downlink from the gNBs 101-103 and/or receiving in the sidelink from another UE.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of the present disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications. A UE can be configured one or more bandwidth parts (BWPs) of a system BW for transmissions or receptions of signals or channels.

An NR supports positioning on the Uu interface. In the DL, positioning reference signal (PRS) can be transmitted by a gNB to a UE to enable the UE to perform positioning measurements. In the UL a UE can transmit positioning sounding reference signal (SRS) to enable a gNB to perform positioning measurements. UE measurements for positioning include; DL PRS reference signal received power (DL PRS RSRP), DL PRS reference signal received path power (DL PRS-RSRPP), DL reference signal time difference (DL RSTD), UE Rx-Tx time difference, NR enhanced cell ID (E-CID), DL SSB radio resource management (RRM) measurement, and NR E-CID DL CSI-RS RRM measurement. NG-RAN measurements for positioning include; UL relative time of arrival (UL-RTOA), UL angle of arrival (UL AoA), UL SRS reference signal received power (UL SRS-RSRP), UL SRS reference signal received path power (UL SRS-RSRPP) and gNB Rx-Tx time difference. NR introduced several radio access technology (RAT) dependent positioning methods; time difference of arrival based methods such DL time difference of arrival (DL-TDOA) and UL time difference of arrival (UL TDOA), angle based methods such as UL angle of arrival (UL AoA) and DL angle of departure (DL AoD), multi-round trip time (RTT) based methods and E-CID based methods.

Positioning schemes can be UE-based, i.e., the UE determines the location or UE-assisted (e.g., location management function (LMF) based), i.e., UE provides measurements for a network entity (e.g., LMF) to determine the location, or NG-RAN node assisted (i.e., NG-RAN node such as gNB provides measurement to LMF). LTE positioning protocol (LPP), as illustrated in 3GPP standard specification TS 37.355, first introduce for LTE and then extended to NR is used for communication between the UE and LMF. NR positioning protocol annex (NRPPa), as illustrated in 3GPP standard specification TS 38.455, is used for communication between the gNB and the LMF.

Figure 6A:
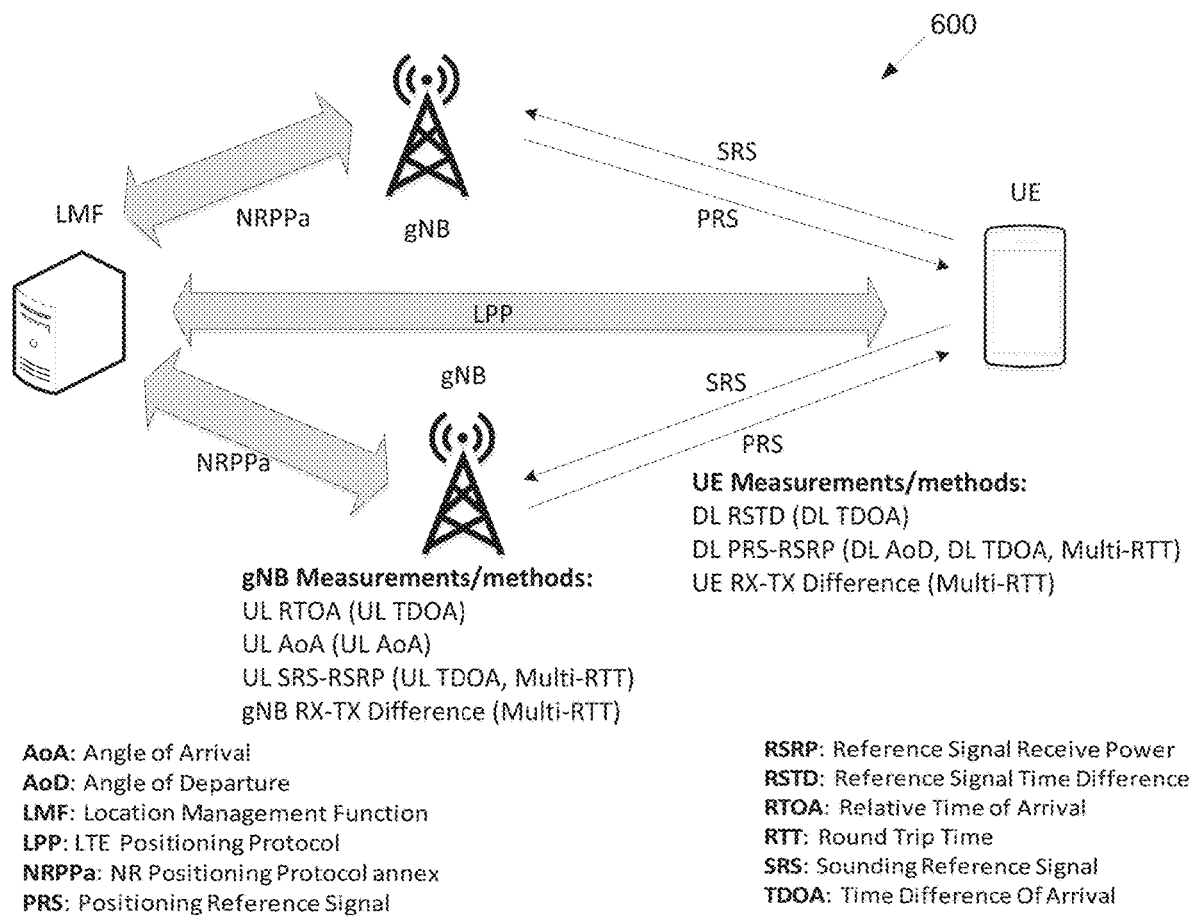
FIG. 6A illustrates an example of network positioning architecture according to embodiments of the present disclosure.

FIG. 6A illustrates an example of network positioning architecture 600 according to embodiments of the present disclosure. An embodiment of the network positioning architecture 600 shown in FIG. 6A is for illustration only. FIG. 6A illustrates the overall positioning architecture along with positioning measurements and methods.

Figure 6B:
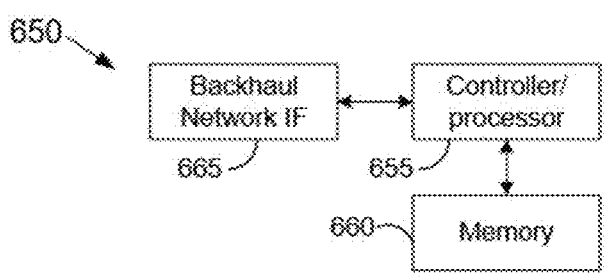
FIG. 6B illustrates an example location management function (LMF) according to embodiments of the present disclosure.

FIG. 6B illustrates an example LMF 650 according to embodiments of the present disclosure. The embodiment of the LMF 650 shown in FIG. 6B is for illustration only. However, LMFs come in a wide variety of configurations, and FIG. 6B does not limit the scope of this disclosure to any particular implementation of an LMF.

As shown in FIG. 6B, the LMF 650 includes a controller/processor 655, a memory 660, and a backhaul or network interface 665. The controller/processor 655 can include one or more processors or other processing devices that control the overall operation of the LMF 650. For example, the controller/processor can support functions related to positioning and location services. Any of a wide variety of other functions can be supported in the LMF 650 by the controller/processor 655. In some embodiments, the controller/processor 655 includes at least one microprocessor or microcontroller.

The controller/processor 655 is also capable of executing programs and other processes resident in the memory 660, such as a basic OS. In some embodiments, the controller/processor 655 supports communications between entities, such as gNB 102 and UE 116 and supports protocols such as LPP and NRPPA. The controller/processor 655 can move data into or out of the memory 660 as required by an executing process.

The controller/processor 655 is also coupled to the backhaul or network interface 665. The backhaul or network interface 665 allows the LMF 650 to communicate with other devices or systems over a backhaul connection or over a network. The interface 665 can support communications over any suitable wired or wireless connection(s). For example, when the LMF 650 is implemented as part of a cellular communication system or wired or wireless local area network (such as one supporting 5G, LTE, or LTE-A), the interface 665 can allow the LMF 650 to communicate with gNBs or eNBs or other network elements over a wired or wireless backhaul connection. The interface 665 includes any suitable structure supporting communications over a wired or wireless connection, such as an Ethernet or RF transceiver.

The memory 660 is coupled to the controller/processor 655. Part of the memory 660 can include a RAM, and another part of the memory 660 can include a Flash memory or other ROM. In certain embodiments, a plurality of instructions, such as a location management algorithm is stored in memory 660. The plurality of instructions is configured to cause the controller/processor 655 to perform location management process and to perform positioning or location services algorithms.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also convey conflict information, and physical SL broadcast channel (PSBCH) conveying system information to assist in SL synchronization.

SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, and SL primary synchronization signals (S-PSS) and SL secondary synchronization signals (S-SSS) for SL synchronization. SCI can include two parts/stages corresponding to two respective SCI formats where, for example, the first SCI format is multiplexed on a PSCCH and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0). In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a UE can be (pre-)configured one of two options for reporting of HARQ-ACK information by the UE: (1) HARQ-ACK reporting option 1, a UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) HARQ-ACK reporting option 2, a UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option 1, when a UE that transmitted the PSSCH detects a NACK in a PSFCH reception, the UE can transmit another PSSCH with the TB (retransmission of the TB). In HARQ-ACK reporting option 2 when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $\{t'_0{}^{SL}, t'_1{}^{SL}, t'_2{}^{SL}, \ldots, t'_{T'_{MAX}-1}{}^{SL}\}$ and can be configured, for example, at least using a bitmap. Where, $T'_{MAX}$ is the number of SL slots in a resource pool, e.g., in 1024 frames. Within each slot $t'_y{}^{SL}$ of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m \cdot n_{subCHsize}+j$, where $j=0, 1, \ldots, n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window [n+T$_1$, n+T$_2$], such that a single-slot resource for transmission, $R_{x,y}$ is defined as a set of $L_{subCH}$ contiguous subchannels x+i, where i=0, 1, . . . , $L_{subCH}-1$ in slot $t_y{}^{SL}$. T$_1$ is determined by the UE such that, $0 \le T_1 \le T_{proc,1}{}^{SL}$, where $T_{proc,1}{}^{SL}$ is a PSSCH processing time for example as defined in TS 38.214. T$_2$ is determined by the UE such that $T_{2min} \le T_2 \le$ Remaining Packet Delay Budget, as long as $T_{2min} \le$ Remaining Packet Delay Budget, else T$_2$ is equal to the Remaining Packet Delay Budget. $T_{2min}$ is configured by higher layers and depends on the priority of the SL transmission.

The slots of a SL resource pool are determined as shown in TABLE 1.

TABLE 1

1. Let set of slots that may belong to a resource be denoted by $\{t_0{}^{SL}, t_1{}^{SL}, t_2{}^{SL}, \ldots, t_{T_{MAX}-1}{}^{SL}\}$, where $0 \le t_i{}^{SL} < 10240 \times 2^\mu$, and $0 \le i < T_{max} \cdot \mu$ is the sub-carrier spacing configuration. $\mu = 0$ for a 15 kHz sub-carrier spacing. $\mu = 1$ for a 30 kHz sub-carrier spacing. $\mu = 2$ for a 60 kHz sub-carrier spacing. $\mu = 3$ for a 120 kHz sub-carrier spacing. The slot index is relative to slot#0 of SFN#0 (system frame number 0) of the serving cell, or DFN#0 (direct frame number 0). The set of slots includes all slots except:
  a. $N_{S-SSB}$ slots that are configured for SL SS/PBCH Block (S-SSB).
  b. $N_{nonSL}$ slots where at least one SL symbol is not not-semi-statically configured as UL symbol by higher layer parameter tdd-UL-DL-ConfigurationCommon or sl-TDD-Configuration. In a SL slot, OFDM symbols Y-th, (Y+1)-th, . . . ., (Y+X-1)-th are SL symbols, where Y is determined by the higher layer parameter sl-StartSymbol and X is determined by higher layer parameter sl-LengthSymbols.
  c. $N_{reserved}$ reserved slots. Reserved slots are determined such that the slots in the set $\{t_0{}^{SL}, t_1{}^{SL}, t_2{}^{SL}, \ldots, t_{T_{MAX}-1}{}^{SL}\}$ is a multiple of the bitmap length ($L_{bitmap}$), where the bitmap ($b_0, b_1, \ldots, b_{L_{bitmap}-1}$) is configured by higher layers. The reserved slots are determined as follows:
    i. Let $\{l_0, l_1, \ldots, l_{2^\mu \times 10240 - N_{S-SSB}-N_{nonSL}-1}\}$ be the set of slots in range $0 \ldots 2^\mu \times 10240 - 1$, excluding S-SSB slots and non-SL slots. The slots are arranged in ascending order of the slot index.
    ii. The number of reserved slots is given by: $N_{reserved} = (2^\mu \times 10240 - N_{S-SSB} - N_{nonSL})$ mod $L_{bitmap}$.
    iii. The reserved slots $l_r$ are given by: $r = \left\lfloor \dfrac{m \cdot (2^\mu \times 10240 - N_{S-SSB} - N_{nonSL})}{N_{reserved}} \right\rfloor$, where $m = 0, 1, \ldots,$ $N_{reserved} - 1$
$T_{max}$ is given by: $T_{max} = 2^\mu \times 10240 - N_{S-SSB} - N_{nonSL} - N_{reserved}$.
2. The slots are arranged in ascending order of slot index.
3. The set of slots belonging to the SL resource pool, $\{t'_0{}^{SL}, t'_1{}^{SL}, t'_2{}^{SL}, \ldots$ $t'_{T'_{MAX}-1}{}^{SL}\}$, are determined as follows:
  a. Each resource pool has a corresponding bitmap ($b_0, b_1, \ldots, b_{L_{bitmap}-1}$) of length $L_{bitmap}$.

TABLE 1-continued b. A slot $t_k{}^{SL}$ belongs to the SL resource pool if $b_{k \bmod L_{bitmap}} = 1$
  c. The remaining slots are indexed successively staring from $0, 1, \ldots$ $T'_{MAX} - 1$.
  Where, $T'_{MAX}$ is the number of remaining slots in the set.

Slots can be numbered (indexed) as physical slots or logical slots, wherein physical slots include all slots numbered sequential, while logical slots include only slots that are allocated to sidelink resource pool as described above numbered sequentially. The conversion from a physical duration, $P_{rsvp}$, in milli-second to logical slots, $P'_{rsvp}$, is given by $$P'_{rsvp} = \left\lceil \frac{T'_{max}}{10240 \text{ ms}} \times P_{rsvp} \right\rceil$$

(as illustrated in 3GPP standard specification 38.214).

For resource (re-)selection or re-evaluation in slot n, a UE can determine a set of available single-slot resources for transmission within a resource selection window [n+T$_1$, n+T$_2$], such that a single-slot resource for transmission, $R_{x,y}$ is defined as a set of $L_{subCH}$ contiguous subchannels x+i, where i=0, 1, . . . , $L_{subCH}-1$ in slot $t_y{}^{SL}$. T$_1$ is determined by the UE such that, $0 \le T_1 \le T_{proc,1}{}^{SL}$, where $T_{proc,1}{}^{SL}$ is a PSSCH processing time for example as defined 3GPP standard specification (TS 38.214). T$_2$ is determined by the UE such that $T_{2min} \le T_2 \le$ Remaining Packet Delay Budget, as long as $T_{2min} <$ Remaining Packet Delay Budget, else T$_2$ is equal to the Remaining Packet Delay Budget. $T_{2min}$ is configured by higher layers and depends on the priority of the SL transmission.

The resource (re-)selection is a two-step procedure: (1) the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE doesn't transmit SL. The resources excluded are based on reserved transmissions or semi-persistent transmissions that can collide with the excluded resources or any of reserved or semi-persistent transmissions; the identified candidate resources after resource exclusion are provided to higher layers and (2) the second step (e.g., preformed in the higher layers) is to select or re-select a resource from the identified candidate resources.

During the first step of the resource (re-)selection procedure, a UE can monitor slots in a sensing window [n–T$_0$, n–T$_{proc,0}$), where the UE monitors slots belonging to a corresponding sidelink resource pool that are not used for the UE's own transmission. To determine a candidate single-slot resource set to report to higher layers, a UE excludes (e.g., resource exclusion) from the set of available single-slot resources for SL transmission within a resource pool and within a resource selection window as shown in TABLE 2.

TABLE 2

1. Single slot resource $R_{x,y}$, such that for any slot $t'^{SL}_m$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below.
2. Single slot resource $R_{x,y}$, such that for any received SCI within the sensing window:
   1. The associated L1-RSRP measurement is above a (pre-)configured SL-RSRP threshold, where the SL-RSRP threshold depends on the priority indicated in the received SCI and that of the SL transmission for which resources are being selected.
   2. (Condition 2.2) The received SCI in slot $t'^{SL}_m$, or if "Resource reservation field" is present in the received SCI the same SCI is assumed to be received in slot $t'^{SL}_{m+q \times P'_{rsvp\_Rx}}$, indicates a set of resource blocks that overlaps $R_{x,y+j \times P'_{rsvp\_Tx}}$.
   Where,
   ■ q = 1,2, ... , Q, where,

• If $P_{rsvp\_RX} \le T_{scal}$ and $n' - m < P'_{rsvp\_Rx} \to Q = \left\lceil \dfrac{T_{scal}}{P_{rsvp\_RX}} \right\rceil$.

$T_{scal}$ is $T_2$ in units of milli-seconds.
   • Else Q = 1
   • If n belongs to $(t'^{SL}_0, t'^{SL}_1, \ldots, t'^{SL}_{T'_{max}-1})$, n' = n, else n' is the first slot after slot n belonging to set $(t'^{SL}_0, t'^{SL}_1, \ldots, t'^{SL}_{T'_{max}-1})$.
   ■ j = 0, 1, ... , $C_{resel}$ − 1
   ■ $P_{rsvp\_RX}$ is the indicated resource reservation period in the received SCI in physical slots, and $P'_{rsvp\_Rx}$ is that value converted to logical slots.
   ■ $P'_{rsvp\_Tx}$ is the resource reservation period of the SL transmissions for which resources are being reserved in logical slots.
3. If the candidate resources are less than a (pre-)configured percentage, such as 20%, of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources. For a pre-selected resource to be first-time signaled in slot m, the UE performs a re-evaluation check at least in slot m−$T_3$.

The re-evaluation check includes: (1) performing the first step of the SL resource selection procedure (as illustrated in 3GPP standard specification 38.214), which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot m−$T_3$.

When pre-emption check is enabled by higher layers, a pre-emption check includes: (1) performing the first step of the SL resource selection procedure (as illustrated in 3GPP standard specification 38.214), which involves identifying candidate (available) sidelink resource set in a resource selection window as previously described; (2) if the pre-selected and reserved resource is available in the candidate sidelink resource set, the resource is used/signaled for sidelink transmission; and (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$.

If the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority. Else, the resource is used/signaled for sidelink transmission.

The positioning solutions provided for release 16 target the following commercial requirements for commercial applications as shown in TABLE 3.

TABLE 3

| Requirement characteristic | Requirement target |
| --- | --- |
| Horizontal Positioning Error | Indoor: 3 m for 80% of the UEs |
| | Outdoor: 10 m for 80% of the UEs |
| Vertical Positioning Error | Indoor: 3 m for 80% of the UEs |
| | Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing based positioning schemes as well as angle-based positioning schemes have been considered. For timing based positioning schemes, NR supports DL time difference of arrival (DL-TDOA), using positioning reference signals (PRS) for time of arrival measurements. NR also supports UL time difference of arrival (UL-TDOA), using sounding reference signals (SRS) for time of arrival measurements.

NR also supports round-trip time (RTT) with one or more neighboring gNBs or transmission/reception points (TRPs). For angle based positioning schemes, NR exploits the beam-based air interface, supporting downlink angle of departure (DL-AoD), as well as uplink angle of arrival (UL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, terrestrial beacon system (TBS), as well as sensors within the UE such as accelerometers, gyroscopes, magnetometers, etc. Some of the UE sensors are also known as inertial measurement unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (as illustrated in 3GPP standard specification TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases [RP-201518]. The study focused on identifying positioning use cases and requirements for V2X and public safety as well as identifying potential deployment and operation scenarios. The outcome of the study item is included in TR 38.845.

V2X positioning requirements depend on the service the UE operates, and are applicable to absolute and relative positioning. Use cases include indoor, outdoor and tunnel areas, within network coverage or out of network coverage; as well as with GNSS-based positioning available, or not available, or not accurate enough; and with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range. The 5G system can also support determining the velocity of a UE with a speed accuracy better than 0.5 m/s and a 3-dimension direction accuracy better than 5 degrees. Public safety positioning is to support indoor and outdoor use cases, with in network coverage or out of network coverage; as well as with GNSS-based positioning available, or not available, or not accurate enough. Public safety positioning use cases target a 1-meter horizontal accuracy and a vertical accuracy of 2 m (absolute) or 0.3 m (relative).

In terms of deployment and operation scenarios for in-coverage, partial-coverage and out-of-coverage NR positioning use case, 3GPP standard specification TR 38.845 has identified the following: (1) for network coverage, in-network coverage, partial network coverage as well as out-of-network coverage. In addition to scenarios with no GNSS and no network coverage; (2) radio link, Uu interface (UL/DL interface) based solutions, PC5 interface (SL interface) based solutions and their combinations (hybrid solutions). As well as RAT-independent solutions such as GNSS and sensors; (3) positioning calculation entity, network-based positioning when the positioning estimation is performed by the network and UE-based positioning when the positioning estimation is performed by the UE; (4) a UE type, for V2X UEs, this can be a UE installed in a vehicle, a road-side unit (RSU), or a vulnerable road user (VRU). Some UEs can have distributed antennas, e.g., multiple antenna patterns that can be leveraged for positioning. UEs can have different power supply limitations, for example VRUs or handheld UEs have limited energy supply compared to other UEs; and (5) spectrum, this can include licensed spectrum and unlicensed spectrum for the Uu interface and the PC5 interface; as well as ITS-dedicated spectrum for the PC5 interface.

In the present disclosure, signaling aspects related to the signaling of SL positioning reference signal over the SL interface is provided. The term "SL positioning reference signals," refers to reference signals transmitted by a SL UE on the SL interface (e.g., PC5 interface), that can be used for SL positioning measurements. SL positioning reference signals can also be referred to as SL sounding reference signal for positioning.

SL is one of the promising features of NR, targeting verticals such the automotive industry, public safety, industrial internet of things (IIoT) and other commercial applications. 3GPP Rel-16 is the first NR release to include sidelink through work item "5G V2X with NR sidelink" with emphasis on V2X and public safety where the requirements are met. In Rel-17, the support of SL has been expanded to other types of UEs such a vulnerable road users (VRUs), pedestrian UEs (PUEs) and other types of handheld devices, by supporting mechanisms for power saving for SL resource allocation as well as mechanisms that enhance reliability and reduce latency of SL transmissions.

Another feature that NR supports is positioning, using the NR radio interface for performing positioning measurements to determine or assist in determining the location of a UE. NR positioning was first introduced using the Uu interface in Rel-16, through work item "NR positioning support." Rel-17 further enhanced accuracy and reduced the latency of NR-based positioning through work item "NR positioning enhancements." In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. In Rel-18 a new study item has been approved to study and evaluate performance and feasibility of potential solutions for SL positioning. The study item has been converted into a work item to specify some of the findings of the study item.

In the present disclosure, a structure for the SL positioning signal to be used for SL positioning measurements is considered. A transmission of SL positioning reference signal includes reference signal used for position and associated control information. Control information can include a first stage (or first part) control information and a second stage (or second part) control information.

The present disclosure relates to a 5G/NR communication system. The present disclosure introduces a structure for SL positioning reference signals including the structure of transmission for SL positioning reference signal.

In the following examples, time can be expressed in one of following: (1) logical slots within a resource pool: (i) a logical slot index for a slot within a resource pool is denoted as $t'^{SL}_i$, and (ii) a time period expressed in logical slots within a resource pool is denoted as T'; (2) logical slots that can be in a resource pool. These are the SL slots before the application of the resource pool bitmap, as described in 3GPP standard specification TS 38.214: (i) a logical slot index for a slot that can be in a resource pool is denoted as $t^{SL}_i$, and (ii) a time period expressed in logical slots that can be in a resource pool is denoted as T'. While this is the same notation as used for logical slots within a resource pool the value is different and it may be apparent from the context which value to use; (3) physical slots or physical time: (i) a physical slot number (or index) is denoted as n or n'. n is the physical slot number of any physical slot, while n' is the physical slot number of a slot in the resource pool, and (ii) a time period is expressed as physical time (e.g., in milliseconds (ms)) or in units of physical slots.

When used in the same equation, time units may be the same, i.e.: (1) if logical slots within a resource pool are used in an equation, inequality or expression, the time period in the same equation, inequality or expression may be expressed in units of logical slots within a resource pool; (2) if logical slots that can be in a resource pool are used in an equation, inequality or expression, the time period in the same equation, inequality or expression may be expressed in units of logical slots that can be in a resource pool; and (3) if physical slots are used in an equation, inequality or expression, the time period in the same equation, inequality or expression may be expressed in units of physical slots or physical time scaled by the slot duration.

Time units can be converted from one unit to another. For example, for each logical slot index for a slot within a resource pool there is a corresponding physical slot number. The converse is not true, i.e., not every physical slot corresponds to a logical slot within a resource pool. When converting from physical slot number to logical slot index: (1) if the physical slot is in the resource pool, the corresponding logical slot index within the resource pool is determined; and (2) if the physical slot is not in the resource pool, the index of an adjacent logical slot within the resource pool is determined, wherein one of; (i) the adjacent logical slot is the next logical slot after the physical slot, and (ii) the adjacent logical slot is the pervious logical slot before the physical slot.

To convert from physical time (in ms) to time in units of logical slots within a resource pool, the following equation can be used, wherein T is in units of ms and T' is in units of logical slots within a resource pool:

$$T' = \left\lceil \frac{T'_{max}}{10240 \text{ ms}} \times T \right\rceil$$

wherein, $T'_{max}$ is the number of logical slots within the resource pool in 1024 frames or 10240 ms.

The slot index or the time period provided by higher layers or specified in the specifications can be given in one unit, e.g., in physical slots or in ms, and is converted to a logical slot index or units of logical slots within a resource pool before being used in the corresponding equations, or vice versa.

In the present disclosure a SL positioning reference signal refers generically to a physical reference signal transmitted on the SL interface to assist in determining a position of a SL UE based on measurements performed on the SL positioning reference signal. In one example, a SL positioning reference signal can have a physical signal structure and/or resource allocation similar to the physical signal structure and/or resource allocation of a DL positioning reference signal (PRS) used in DL of the Uu interface in NR, except that it is transmitted/received on the SL interface (PC5 interface). In another example, a SL positioning reference signal can have a physical signal structure and/or resource allocation similar to the physical signal structure and/or resource allocation of a UL positioning sounding reference signal (SRS) used in UL of the Uu interface in NR, except that it is transmitted/received on the SL interface (PC5 interface).

In another example, a SL positioning reference signal can have a physical signal structure and/or resource allocation combining aspects of the physical signal structure and/or resource allocation of (1) DL positioning reference signal (PRS) used in DL of the Uu interface in NR and (2) UL positioning sounding reference signal (SRS) used in UL of the Uu interface in NR, except that it is transmitted/received on the SL interface (PC5 interface). In another example, a SL positioning reference signal can have a new physical signal structure and/or resource allocation for use on the SL interface (PC5 interface).

As described in the U.S. patent application Ser. No. 18/183,037, which is incorporate by reference in its entirety, a reference signal used for positioning can be pre-configured and/or configured and/or allocated a network and/or by a SL UE.

In one embodiment, the network can configure SL resources for SL positioning reference signal and/or SL resources for reporting SL measurements. The network can further configure SL UEs to transmit and/or receive SL positioning reference signals. The network can further configure SL UEs to perform SL positioning measurements.

Figure 6C:
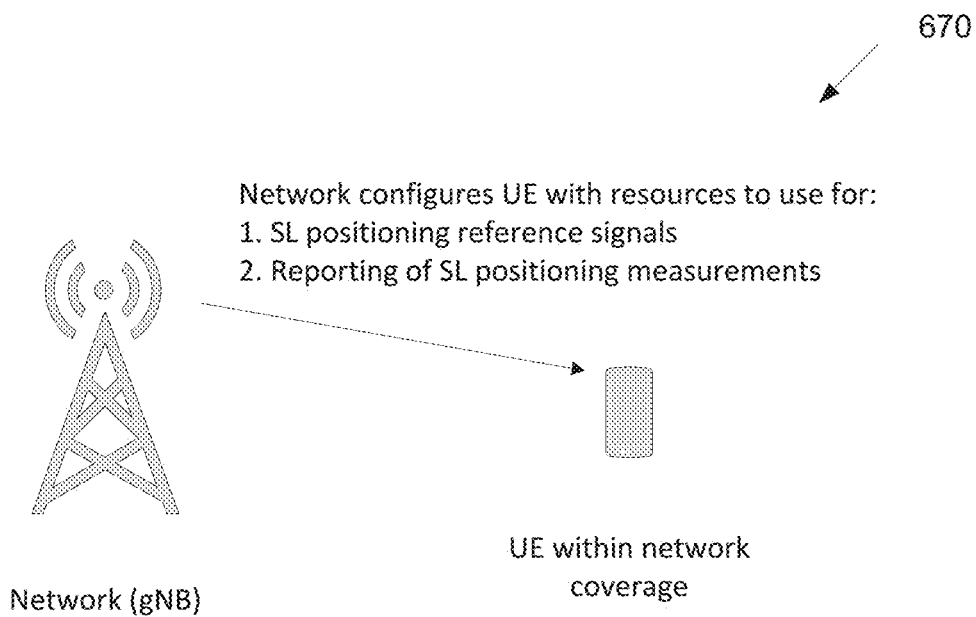
FIG. 6C illustrates an example of network coverage for a UE according to embodiments of the present disclosure.

FIG. 6C illustrates an example of network coverage 670 for a UE according to embodiments of the present disclosure. An embodiment of the network coverage 670 for the UE shown in FIG. 6C is for illustration only.

A UE is in coverage of a network as shown in FIG. 6C. The network can configure the UE with resources to use for: (1) SL positioning reference signals on the SL interface (PC5 interface); and/or (2) reporting of SL positioning measurements on the SL interface (PC5 interface).

In another embodiment, a SL UE is (pre-)configured SL resources for SL positioning reference signal and/or SL resources for reporting SL measurements. The UE can be further configured (e.g., by higher layers (RRC or MAC CE) and/or lower lowers (L1 control)) to transmit and/or receive SL positioning reference signals. The UE can be further configured to perform SL positioning measurements.

The UE can be configured with resources to use for: (1) SL positioning reference signals on the SL interface (PC5 interface); and/or (2) reporting of SL positioning measurements on the SL interface (PC5 interface).

SL Positioning reference signals are reference signals transmitted on the SL interface by a first UE. The SL positioning reference signals are received by one or more second UE(s) (e.g., the SL PRS can be unicast or groupcast or broadcast from a first UE to one or more second UEs), wherein the second UE(s) performs SL positioning measurements on the SL positioning reference signals. SL Positioning measurements are measurements that aid in finding the position of a SL UE, e.g., the absolute position of the first SL UE and/or the absolute position of the second SL UE, and/or the relative of position of the first SL UE to the second SL UE and/or the relative position of the second SL UE to the first SL UE. Absolute position is defined in a frame of reference, e.g., the Global frame of reference (e.g., using latitude and longitude and/or elevation).

SL positioning measurements can include: (1) SL reference signal time difference (RSTD). For example, the time difference between a positioning reference signal received by a SL UE and a reference time; (2) SL reference signal received power (RSRP) of a SL positioning reference signal; (3) SL reference signal received path power (RSRPP) of a SL positioning reference signal; (4) SL angle of arrival (AoA) of a SL positioning reference signal; and (5) SL Rx-Tx time difference. For example, this can be the difference between the receive time of a first SL positioning reference signal and the transmit time of a second SL positioning reference signal.

In one embodiment, structure of a SL transmission including a reference signal for SL positioning measurements is considered. A reference signal for SL positioning measurements is transmitted in a slot. In one example control information associated with the reference signal for SL positioning measurements is transmitted.

In one example, the control information associated with the reference signal for SL positioning measurements is transmitted in a same slot as the slot of the reference signal for SL positioning measurements. This is illustrated in FIG. 7.

Figure 7:
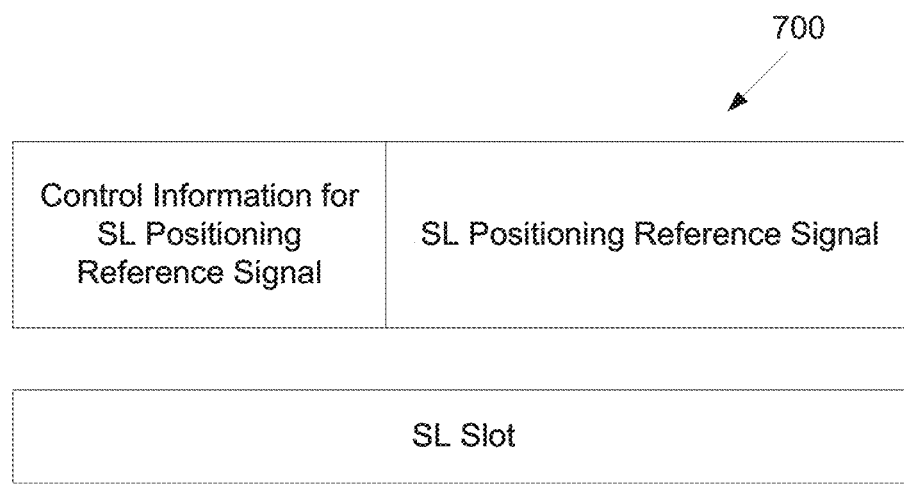
FIG. 7 illustrates an example of control information associated with the reference signal for SL positioning measurements according to embodiments of the present disclosure.

FIG. 7 illustrates an example of control information associated with the reference signal for SL positioning measurements 700 according to embodiments of the present disclosure. An embodiment of the control information associated with the reference signal for SL positioning measurements 700 shown in FIG. 7 is for illustration only.

In one example, the control information associated with the reference signal for SL positioning measurements includes: (1) a first stage (or first part) SL control information; and (2) a second stage (or second part) SL control information.

In one example, the first stage (or first part) SL control information is transmitted in or multiplexed in a PSCCH.

In one example, the first stage (or first part) SL control information is transmitted in or multiplexed in a PSSCH.

In one example, the first stage (or first part) SL control information is transmitted in or multiplexed in a sidelink shared channel (SL-SCH), wherein the SL-SCH is transmitted in a PSSCH. For example, the first stage (or first part) SL control information associated with the reference signal for SL positioning measurements can be included in a MAC CE, wherein the MAC CE is included in the SL-SCH.

In one example, the first stage (or first part) SL control information is transmitted in or multiplexed in a new physical channel designed for conveying the first stage (or first part) control information associated with the reference signal for SL positioning measurements.

In one example, the second stage (or second part) SL control information is transmitted in or multiplexed in a PSCCH.

In one example, the second stage (or second part) SL control information is transmitted in or multiplexed in a PSSCH.

In one example, the second stage (or second part) SL control information is transmitted in or multiplexed in a PSSCH. The second stage (or second part) SL control information is also transmitted in a Sidelink shared channel (SL-SCH), wherein the SL-SCH is transmitted in a PSSCH. For example, the second stage (or second part) SL control information associated with the reference signal for SL positioning measurements can be included in a MAC CE, wherein the MAC CE is included in the SL-SCH.

In one example, the second stage (or second part) SL control information is transmitted in or multiplexed in a Sidelink shared channel (SL-SCH), wherein the SL-SCH is transmitted in a PSSCH. For example, the second stage (or second part) SL control information associated with the reference signal for SL positioning measurements can be included in a MAC CE, wherein the MAC CE is included in the SL-SCH.

In one example, the second stage (or second part) SL control information is transmitted in or multiplexed in a new physical channel designed for conveying the second stage (or second part) SL control information associated with the reference signal for SL positioning measurements.

In the following examples, the first stage (or first part) SCI is denoted as SCI1. The second stage (or second part) is denoted as SCI2. The reference signal for SL positioning measurement (or SL positioning reference signal) is denoted as S-PRS).

In one example, SCI1 and SCI2 are frequency division multiplexed together. SCI1+SCI2 are time division multiplexed with S-PRS. In one example frequency span of SCI1+SCI2 is different from the frequency span of S-PRS.

FIGS. 8-19 illustrate examples of signaling structure for SL positioning measurement 800 to 1900 according to embodiments of the present disclosure. Embodiments of the signaling structure for SL positioning measurement 800 to 1900 shown in FIGS. 8-19 are for illustration only.

Figure 8:
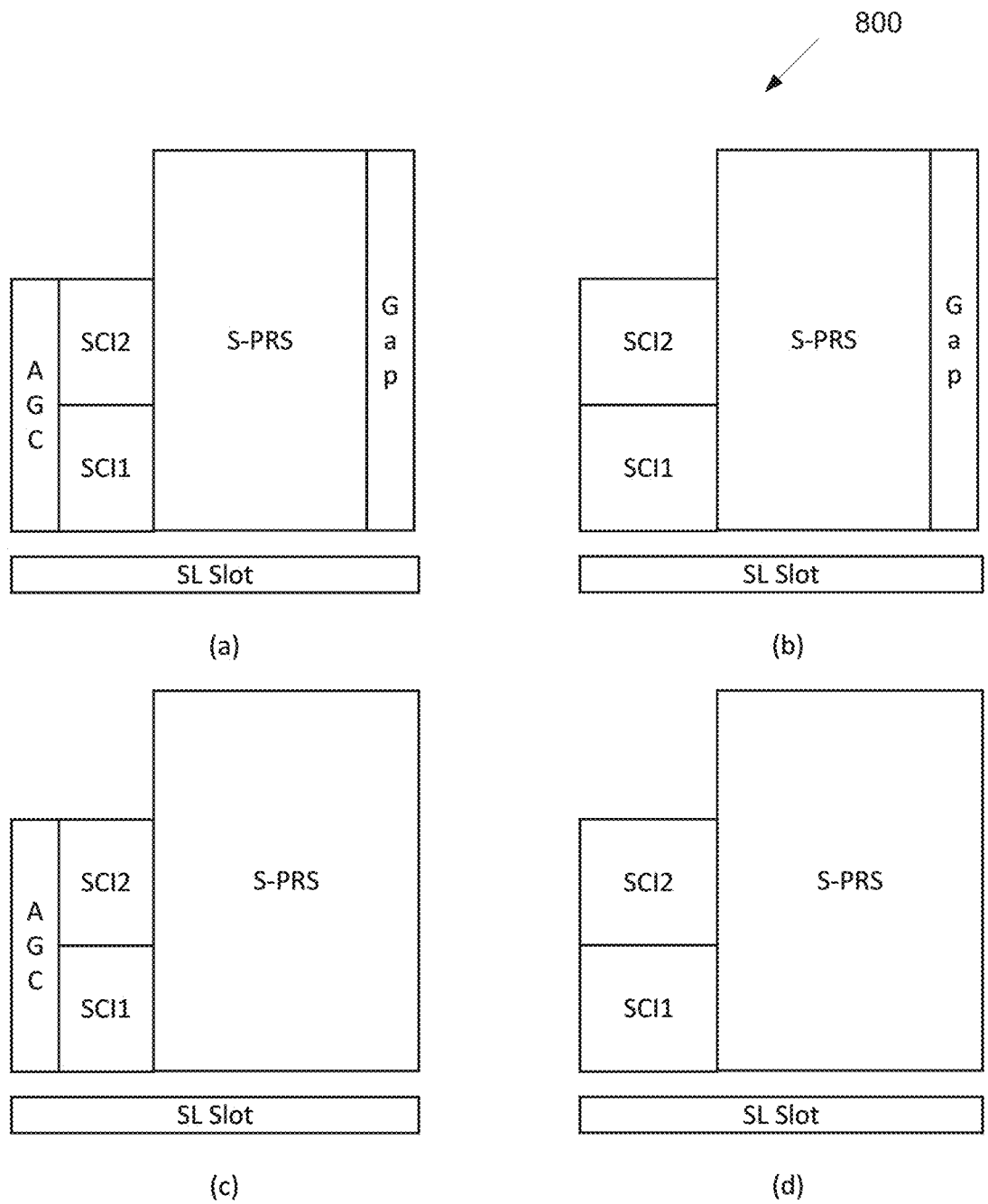
FIGS. 8-19 illustrate examples of signaling structure for SL positioning measurement according to embodiments of the present disclosure.

In one example, the frequency span of SCI1+SCI2 is less than the frequency span of S-PRS. This is illustrated in FIG. 8. In one example, the frequency span of SCI1+SCI2 is more than the frequency span of S-PRS. In one example, there is a gap symbol after the last symbol of S-PRS, as illustrated in FIG. 8 (e.g., (a) and (b) of FIG. 8).

In one example, there is no gap symbol after the last symbol of S-PRS, as illustrated in FIG. 8 (e.g., (c) and (d) of FIG. 8). In one example, the first symbol of SCI1+SCI2 is duplicated, this is denoted as AGC symbol, as illustrated in FIG. 8 (e.g., (a) and (c) of FIG. 9). In one example, the first symbol of SCI1+SCI2 is not duplicated, as illustrated in FIG. 8 (e.g., (b) and (d) of FIG. 8). In one example, the size of SCI1+SCI2 in time domain is 2 or 3 symbols.

In one example, the size of SCI1+SCI2 in time domain is (pre-)configured, e.g., parameter sl-TimeResourcePSCCH in SL-PSCCH_Config configures the number of symbols of PSCCH in a resource pool. The number of symbols of PSCCH is the number of symbols for SCI1 and SCI2. In one example, SCI1 is transmitted and multiplexed in PSCCH. In one example SCI2 is transmitted and multiplexed in PSSCH and there is no SL-SCH in PSSCH (PSSCH only includes SCI2 in this example).

In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1 and SCI2 are frequency division multiplexed together. SCI1+SCI2 are time division multiplexed with S-PRS. The frequency span of SCI1+SCI2 is the same as the frequency span of S-PRS.

Figure 9:
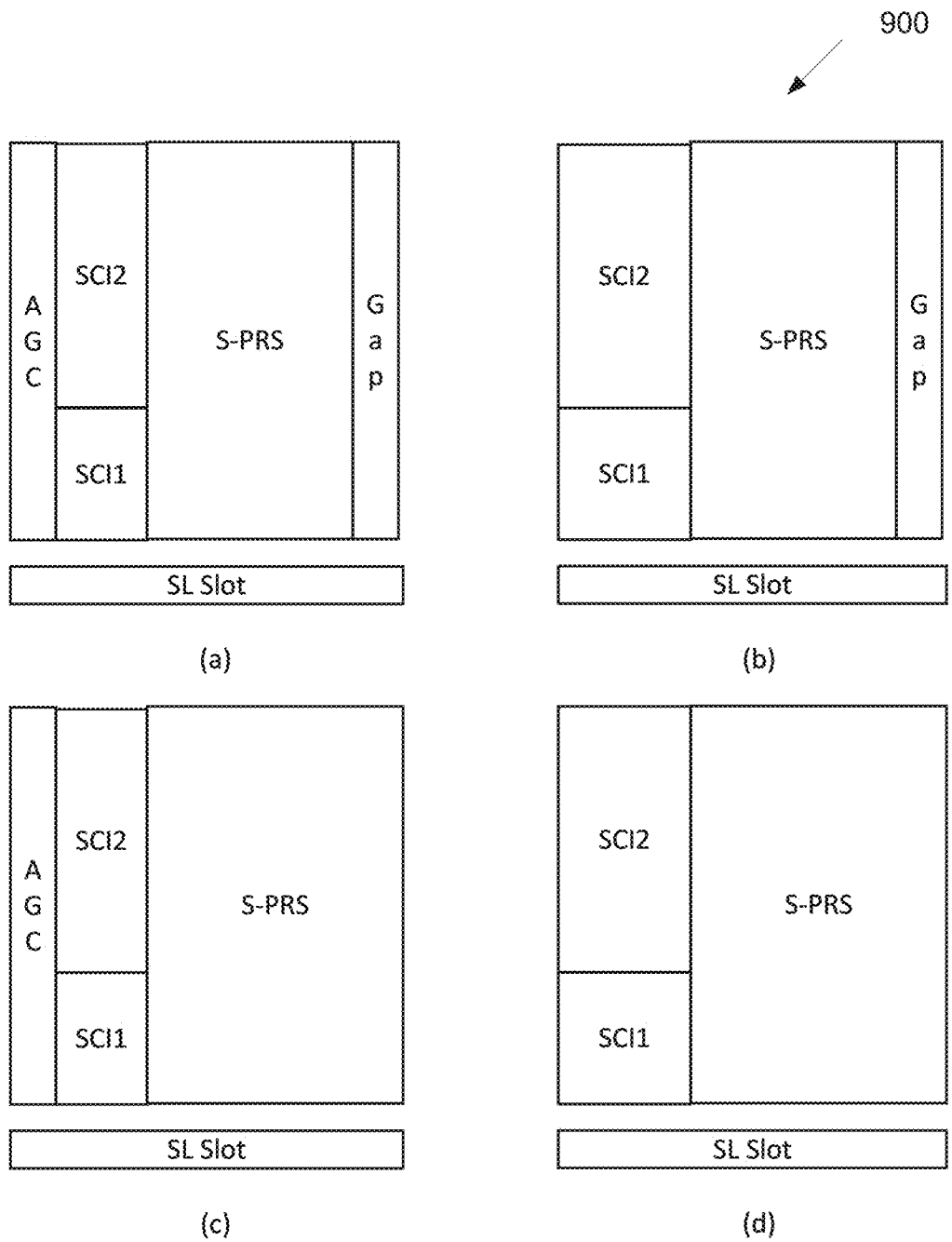

This is illustrated in FIG. 9. In one example, there is a gap symbol after the last symbol of S-PRS, as illustrated in FIG. 9 (e.g., (a) and (b) of FIG. 9). In one example, there is no gap symbol after the last symbol of S-PRS, as illustrated in FIG. 9 (e.g., (c) and (d) of FIG. 9). In one example, the first symbol of SCI1+SCI2 is duplicated, this is denoted as AGC symbol, as illustrated in FIG. 9 (e.g., (a) and (c) of FIG. 9).

In one example, the first symbol of SCI1+SCI2 is not duplicated, as illustrated in FIG. 9 (e.g., (b) and (d) of FIG. 9). In one example, the size of SCI1+SCI2 in time domain is 2 or 3 symbols. In one example, the size of SCI1+SCI2 in time domain is (pre-)configured, e.g., parameter sl-TimeResourcePSCCH in SL-PSCCH_Config configures the number of symbols of PSCCH in a resource pool. The number of symbols of PSCCH is the number of symbols for SCI1 and SCI2. In one example, SCI1 is transmitted and multiplexed in PSCCH. In one example SCI2 is transmitted and multiplexed in PSSCH and there is no SL-SCH in PSSCH (PSSCH only includes SCI2 in this example).

In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1 and SCI2 are frequency division multiplexed together. SCI1+SCI2 are time division multiplexed with S-PRS. In one example frequency span of SCI1+SCI2 is different from the frequency span of S-PRS.

Figure 10:
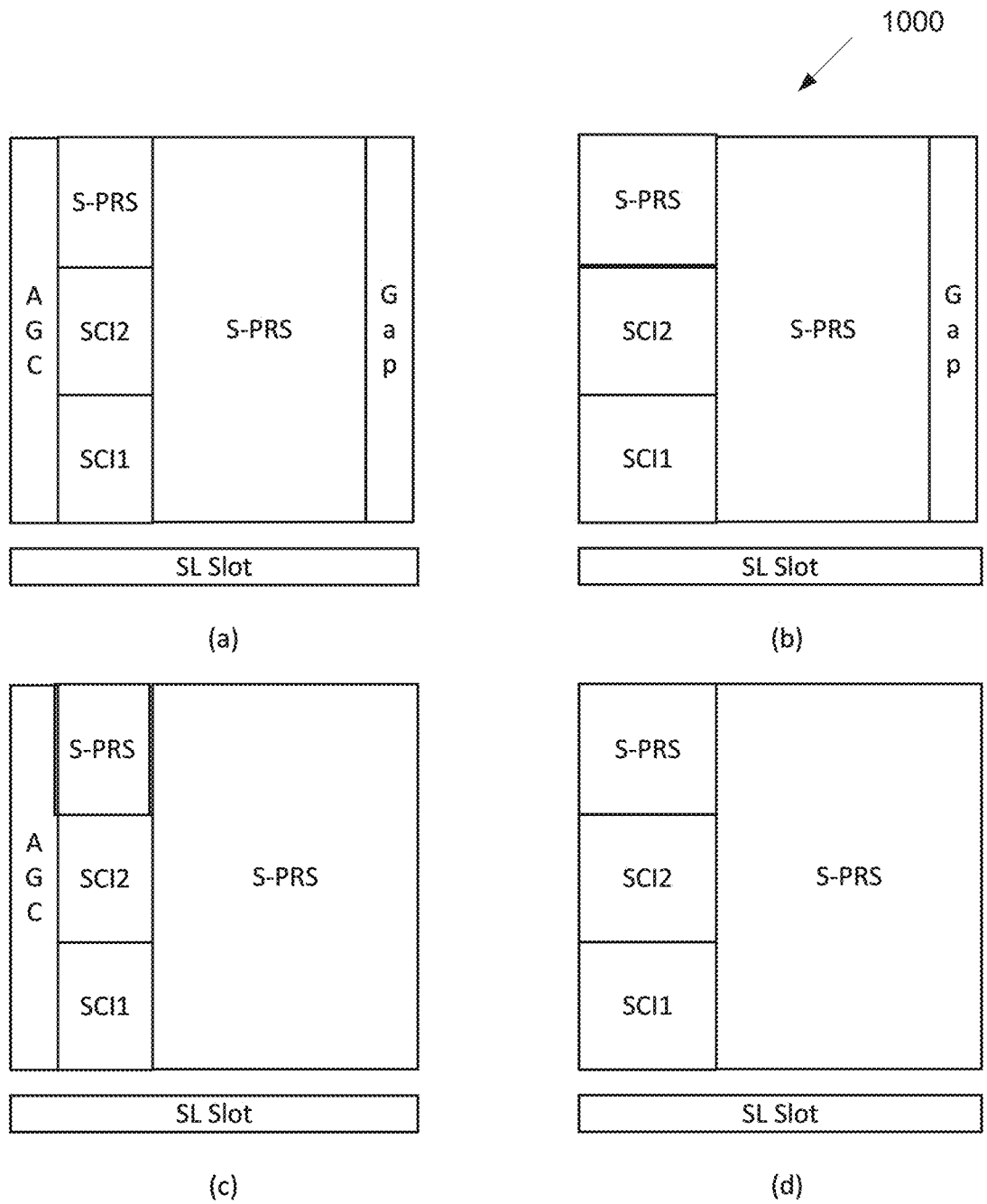

In one example, the frequency span of SCI1+SCI2 is less than the frequency span of S-PRS, and S-PRS is transmitted in the same symbols as SCI1+SCI2 to complement the frequency span of SCI1+SCI2 to be the same size as that of S-PRS in other symbols. This is illustrated in FIG. 10. In one example, there is a gap symbol after the last symbol of S-PRS, as illustrated in FIG. 10 (e.g., (a) and (b) of FIG. 10). In one example, there is no gap symbol after the last symbol of S-PRS, as illustrated in FIG. 10 (e.g., (c) and (d) of FIG. 10).

In one example, the first symbol of SCI1+SCI2+frequency division multiplexed S-PRS is duplicated, this is denoted as AGC symbol, as illustrated in FIG. 10 (e.g., (a) and (c) of FIG. 10). In one example, the first symbol of SCI1+SCI2+frequency division multiplexed S-PRS is not duplicated, as illustrated in FIG. 10 (e.g., (b) and (d) of FIG. 10). In one example, the size of SCI1+SCI2 in time domain is 2 or 3 symbols. In one example, the size of SCI1+SCI2 in time domain is (pre-)configured, e.g., parameter sl-TimeResourcePSCCH in SL-PSCCH Config_configures the number of symbols of PSCCH in a resource pool. The number of symbols of PSCCH is the number of symbols for SCI1 and SCI2 and the frequency division multiplexed S-PRS.

In one example, SCI1 is transmitted and multiplexed in PSCCH. In one example SCI2 is transmitted and multiplexed in PSSCH and there is no SL-SCH in PSSCH (PSSCH only includes SCI2 in this example). In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1, SCI2 and SL-PRS are time division multiplexed together. In one example the frequency spans of SCI1, SCI2 and S-PRS can be different. In one example frequency span of SCI1 and SCI2 are the same, however, the frequency span of SCI1 or SCI2 is different from the frequency span of S-PRS. In one example, the frequency span of SCI1 and SCI2 are the same and is less than the frequency span of S-PRS. This is illustrated in FIG. 11.

In one example, the frequency span of SCI1 and SCI2 are the same and is more than the frequency span of S-PRS. In one example, the frequency span of SCI1 is different from the frequency span of SCI2 (e.g., frequency span of SCI1 is less than the frequency span of SCI2 or vice versa), and the frequency span of SCI2 is the same as that of S-PRS. This is illustrated in FIG. 12.

In one example, the frequency span of SCI1, SCI2 and S-PRS are the same. In one example, there is a gap symbol after the last symbol of S-PRS, as illustrated in FIG. 11 (e.g., (a) and (b) of FIG. 11), and FIG. 12 (e.g., (a) and (b) of FIG. 12). In one example, there is no gap symbol after the last symbol of S-PRS, as illustrated in FIG. 11 (e.g., (c) and (d) of FIG. 11), and FIG. 12 (e.g., (c) and (d) of FIG. 12).

Figure 11:
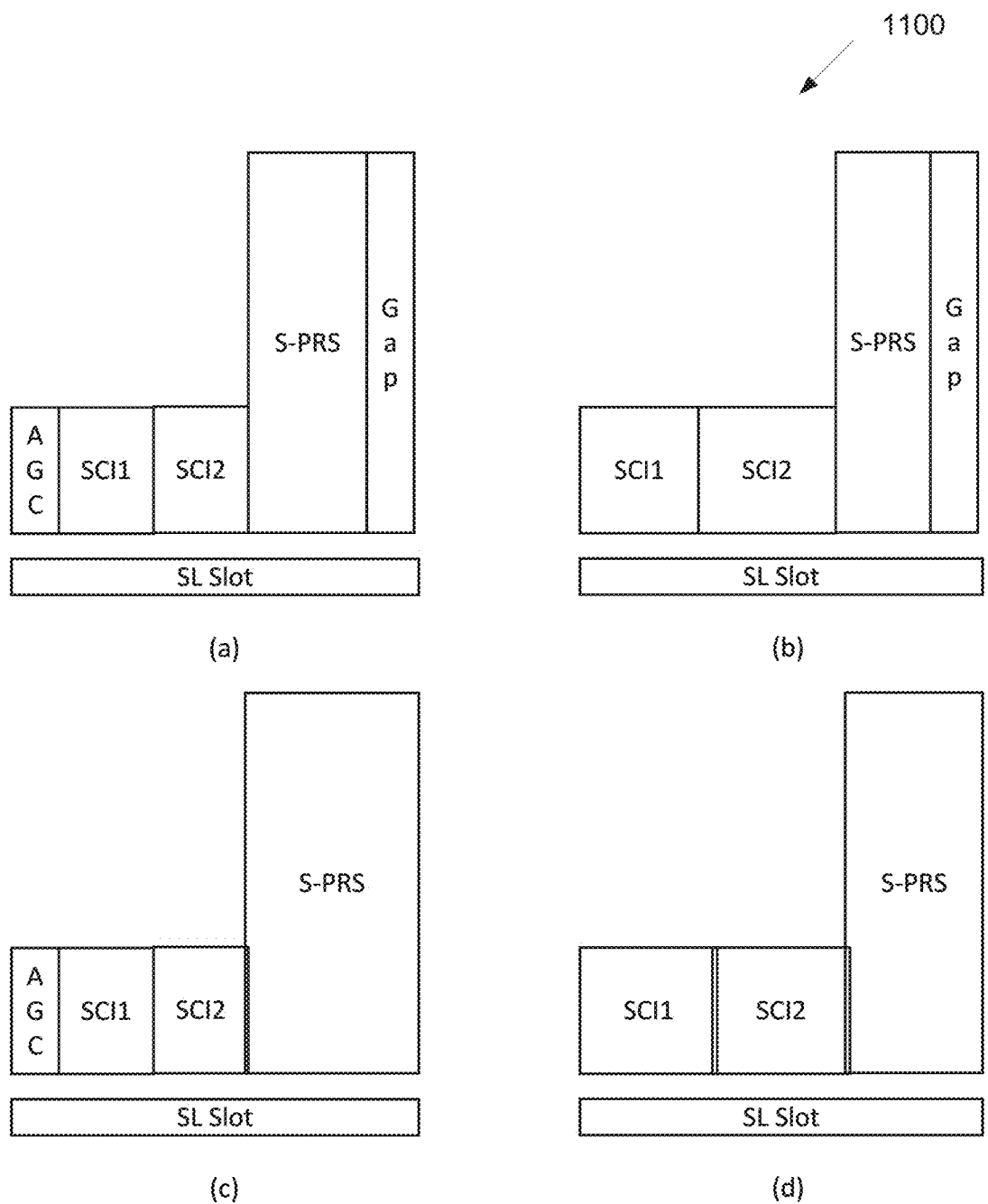
Figure 12:
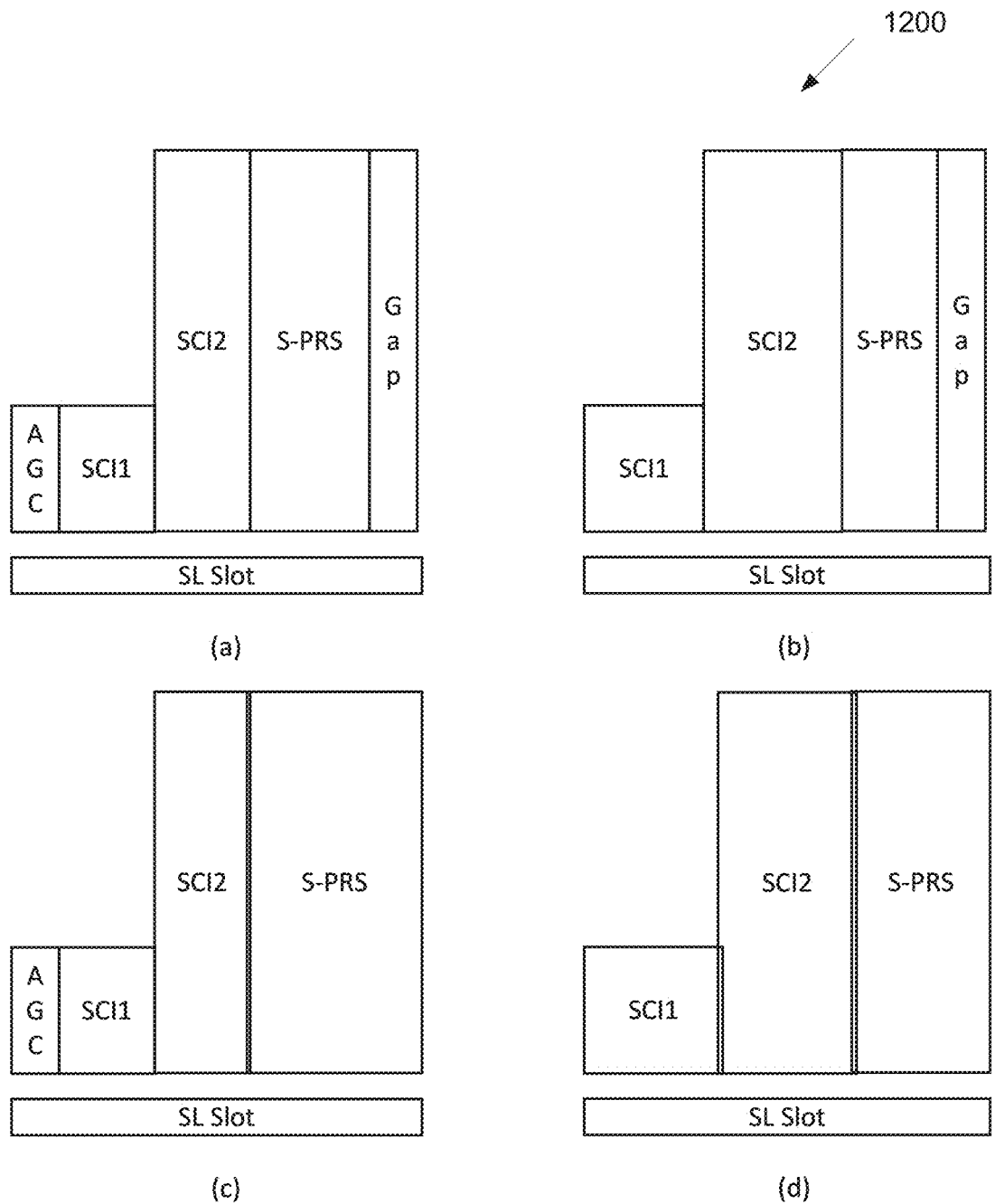

In one example, the first symbol of SCI1 is duplicated, this is denoted as AGC symbol, as illustrated in FIG. 11 (e.g., (a) and (c) of FIG. 11), and FIG. 12 (e.g., (a) and (c) of FIG. 12). In one example, the first symbol of SCI1 is not duplicated, as illustrated in FIG. 11 (e.g., (b) and (d) of FIG. 11), and FIG. 12 (e.g., (b) and (d) of FIG. 12). In one example, the size of SCI1 in time domain is 2 or 3 symbols. In one example, the size of SCI1 in time domain is (pre-)configured, e.g., parameter sl-TimeResourcePSCCH in SL-PSCCH_Config configures the number of symbols of PSCCH in a resource pool. In one example, the size of SCI2 in time domain is the same as the size of SCI1 in time domain.

In one example, the size of SCI2 is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) configured/updated L1 control signaling (e.g., through DCI by the network, or through SCI (e.g., first and/or second stage SCI) of another UE); and (6) the (pre-)configuration can be for a resource pool.

In one example, SCI1 is transmitted and multiplexed in PSCCH. In one example SCI2 is transmitted and multiplexed in PSSCH and there is no SL-SCH in PSSCH (PSSCH only includes SCI2 in this example). In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1, SCI2 and SL-PRS are time division multiplexed together. In one example the frequency spans of SCI1, SCI2 and S-PRS can be different and S-PRS is frequency division multiplexed with SCI1 and SCI2 to make the frequency span of symbols containing SCI1 and SCI2 the same as the frequency span of the S-PRS only symbols. This is illustrated in FIG. 13.

Figure 13:
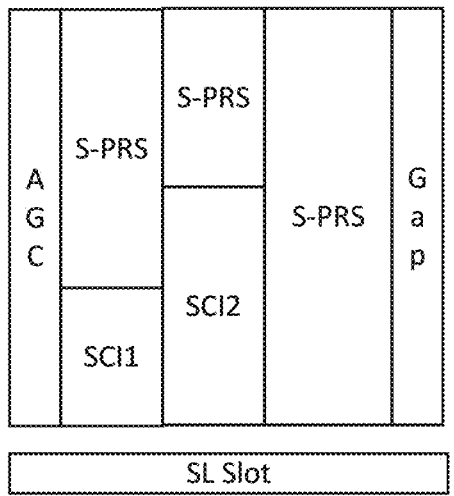
Figure 13:
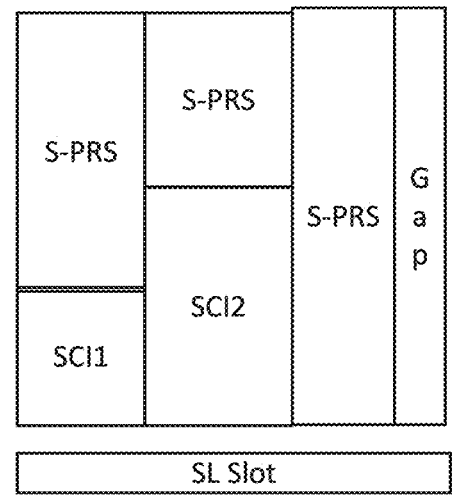
Figure 13:
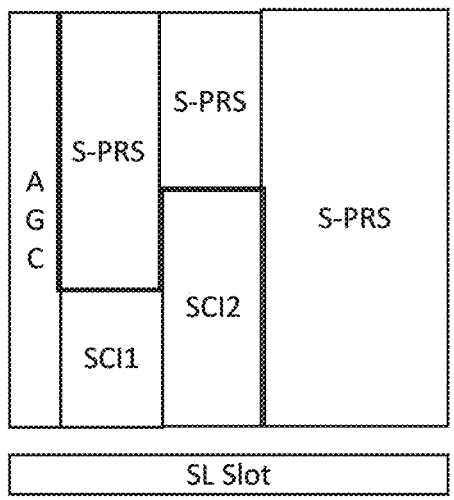
Figure 13:
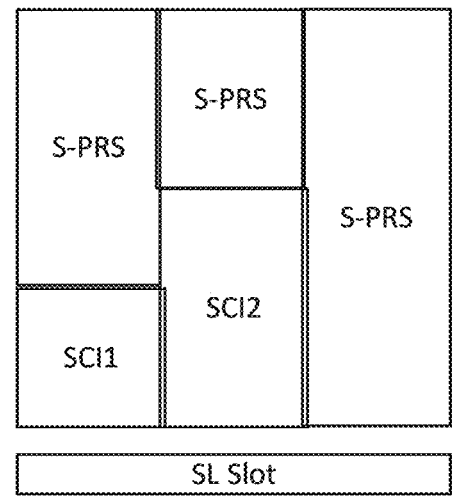

In one example, there is a gap symbol after the last symbol of S-PRS, as illustrated in FIG. 13 (e.g., (a) and (b) of FIG. 13). In one example, there is no gap symbol after the last symbol of S-PRS, as illustrated in FIG. 13 (e.g., (c) and (d) of FIG. 13). In one example, the first symbol of SCI1 is duplicated, this is denoted as AGC symbol, as illustrated in FIG. 13 (e.g., (a) and (c) of FIG. 13).

In one example, the first symbol of SCI1 is not duplicated, as illustrated in FIG. 13 (e.g., (b) and (d) of FIG. 13). In one example, the size of SCI1 in time domain is 2 or 3 symbols. In one example, the size of SCI1 in time domain is (pre-)configured, e.g., parameter sl-TimeResourcePSCCH in SL-PSCCH_Config configures the number of symbols of PSCCH in a resource pool. In one example, the size of SCI2 in time domain is the same as the size of SCI1 in time domain.

In one example, the size of SCI2 is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) configured/updated L1 control signaling (e.g., through DCI by the network, or through SCI (e.g., first and/or second stage SCI) of another UE); and (6) the (pre-)configuration can be for a resource pool.

In one example, SCI1 is transmitted and multiplexed in PSCCH. In one example SCI2 is transmitted and multiplexed in PSSCH and there is no SL-SCH in PSSCH (PSSCH only includes SCI2 in this example). In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1 and SCI2 are multiplexed together as in Rel-16/17 (multiplexing of PSCCH and PSSCH). SCI1+SCI2 and SL-PRS are time division multiplexed together. In one example the frequency spans of SCI1+SCI2 and S-PRS can be different. In one example, the frequency span of SCI1+SCI2 is less than the frequency span of S-PRS. This is illustrated in FIG. 14.

In one example, the frequency span of SCI1+SCI2 is more than the frequency span of S-PRS. In one example, the frequency span of SCI1+SCI2 is the same as that of S-PRS. This is illustrated in FIG. 15. In one example, there is a gap symbol after the last symbol of S-PRS, as illustrated in FIG. 14 (e.g., (a) and (b) of FIG. 14), and FIG. 15 (e.g., (a) and (b) of FIG. 15). In one example, there is no gap symbol after the last symbol of S-PRS, as illustrated in FIG. 14 (e.g., (c) and (d) of FIG. 14), and FIG. 15 (e.g., (c) and (d) of FIG. 15).

Figure 14:
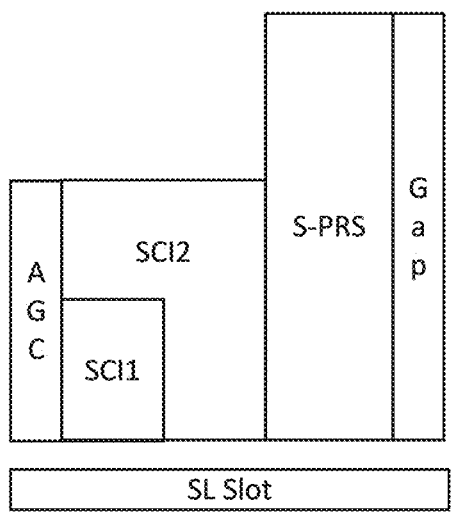
Figure 14:
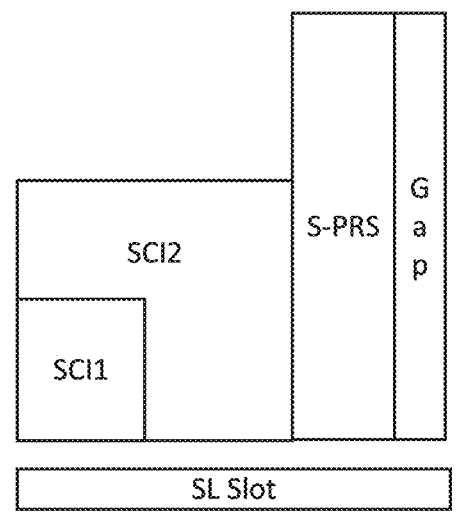
Figure 14:
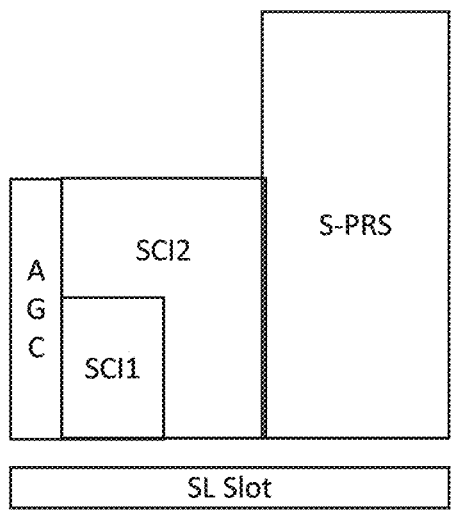
Figure 14:
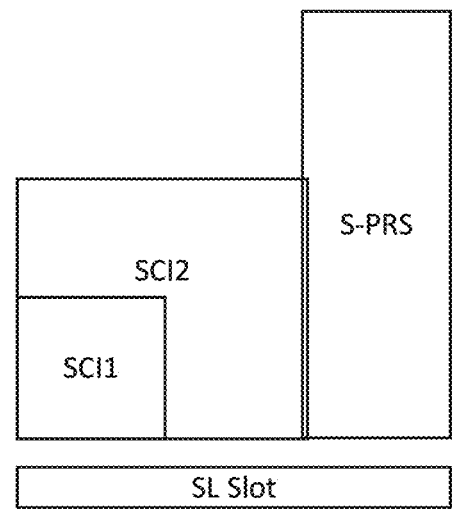
Figure 15:
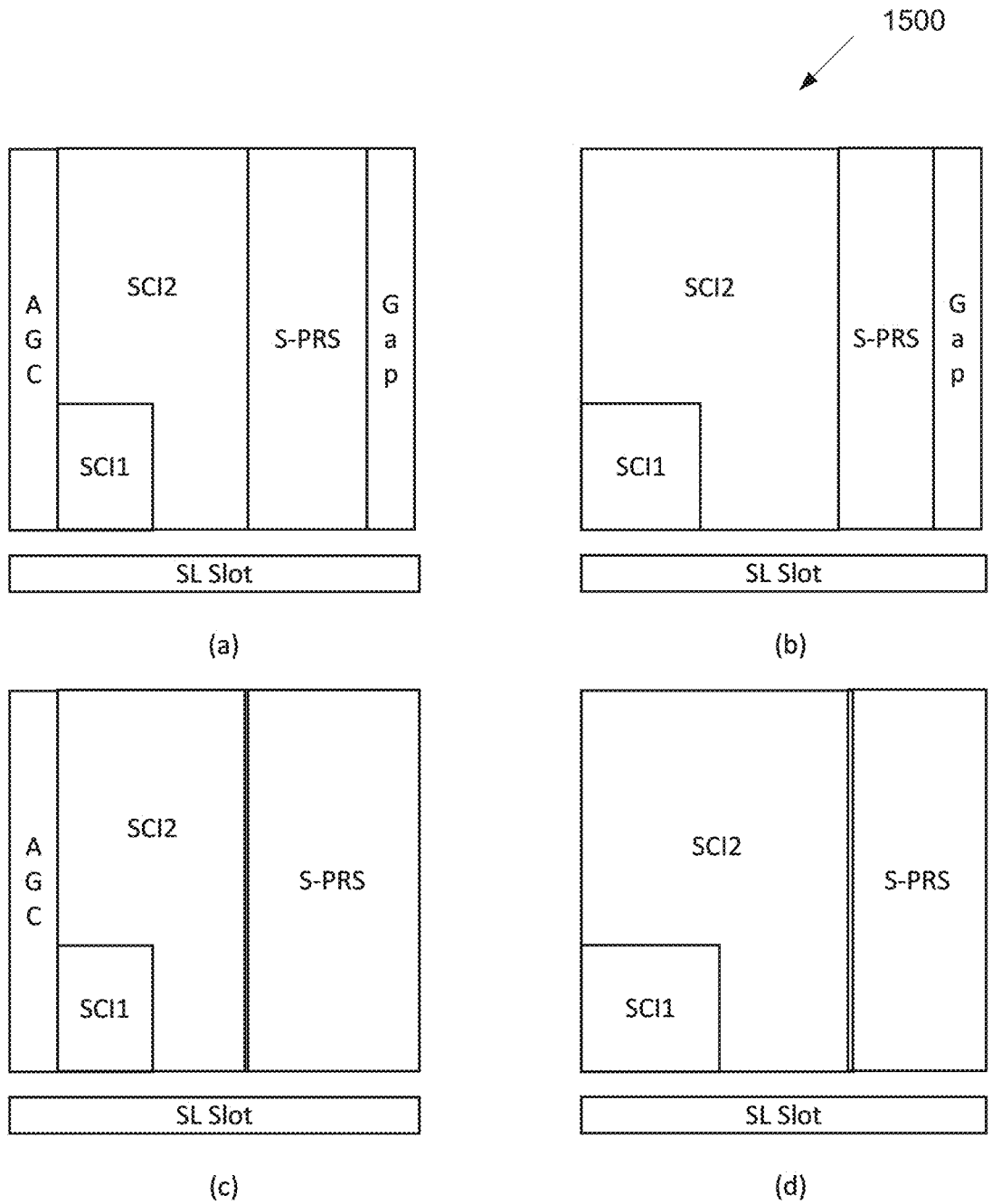

In one example, the first symbol of SCI1 is duplicated, this is denoted as AGC symbol, as illustrated in FIG. 14 (e.g., (a) and (c) of FIG. 14), and FIG. 15 (e.g., (a) and (c) of FIG. 15). In one example, the first symbol of SCI1 is not duplicated, as illustrated in FIG. 14 (e.g., (b) and (d) of FIG. 14), and FIG. 15 (e.g., (b) and (d) of FIG. 15). In one example, the size of SCI1 in time domain is 2 or 3 symbols. In one example, the size of SCI1 in time domain is (pre-)configured, e.g., parameter sl-TimeResourcePSCCH in SL-PSCCH_Config configures the number of symbols of PSCCH in a resource pool. In one example, the size of SCI1+SCI2 in time domain is double the size of SCI1 in time domain.

In one example, the size of SCI2 is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) configured/updated L1 control signaling (e.g., through DCI by the network, or through SCI (e.g., first and/or second stage SCI) of another UE); and (6) the (pre-)configuration can be for a resource pool.

In one example, SCI1 is transmitted and multiplexed in PSCCH. In one example SCI2 is transmitted and multiplexed in PSSCH and there is no SL-SCH in PSSCH (PSSCH only includes SCI2 in this example). In one example, SCI2 is transmitted and multiplexed in PSSCH, and a SL-SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, SCI1 and SCI2 are multiplexed together as in Rel-16/17 (multiplexing of PSCCH and PSSCH). SCI1+SCI2 and SL-PRS are time division multiplexed together. In one example the frequency spans of SCI1+SCI2 and S-PRS can be different. In one example, the frequency span of SCI1+SCI2 is less than the frequency span of S-PRS, and S-PRS is frequency division multiplexed with SCI1 and SCI2 to make the frequency span of symbols containing SCI1 and SCI2 the same as the frequency span of the S-PRS only symbols. This is illustrated in FIG. 16.

Figure 16:
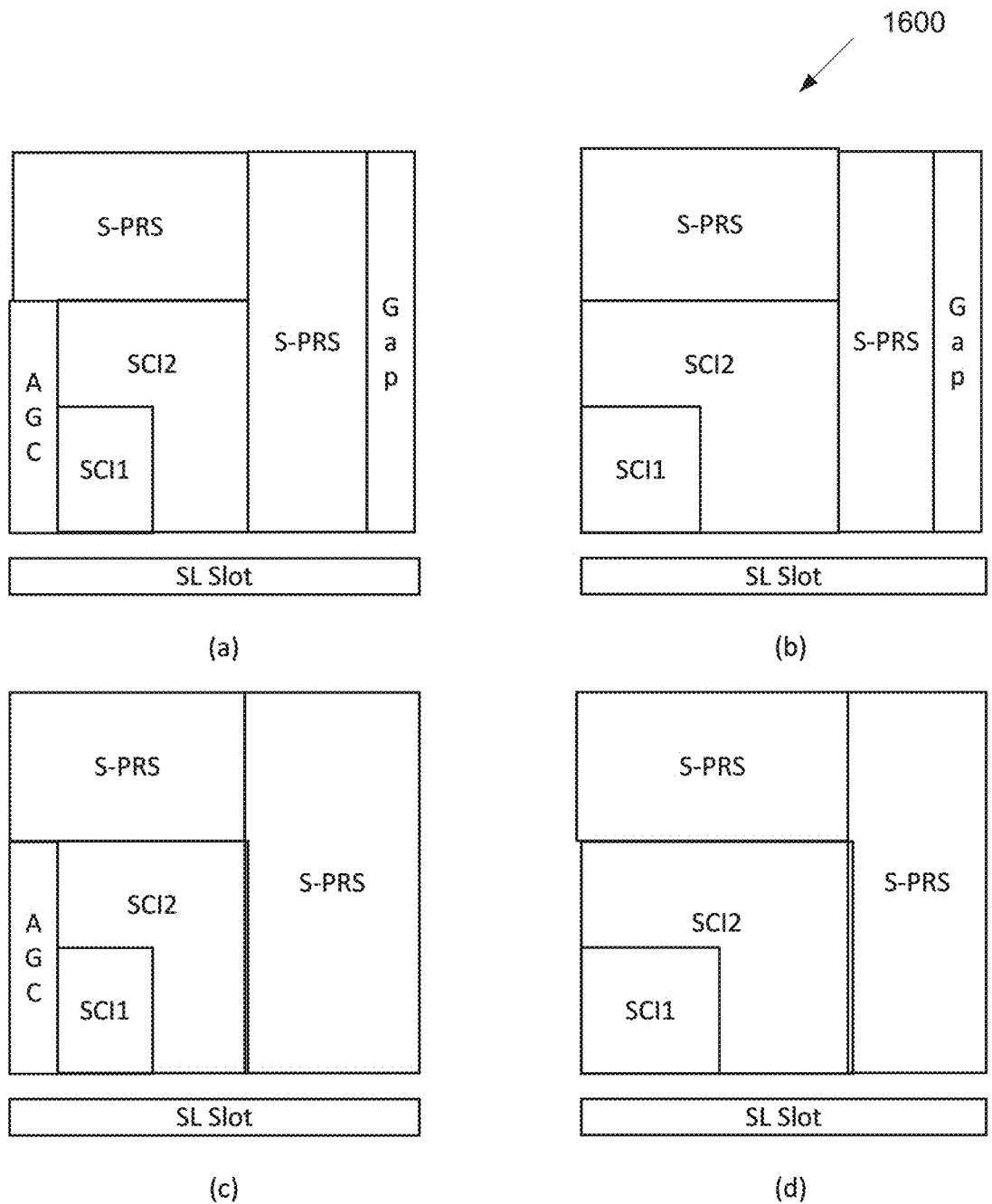

In one example, there is a gap symbol after the last symbol of S-PRS, as illustrated in FIG. 16 (e.g., (a) and (b) of FIG. 16). In one example, there is no gap symbol after the last symbol of S-PRS, as illustrated in FIG. 16 (e.g., (c) and (d) of FIG. 16). In one example, the first symbol of SCI1 is duplicated, this is denoted as AGC symbol, as illustrated in FIG. 16 (e.g., (a) and (c) of FIG. 16).

In one example, the first symbol of SCI1 is not duplicated, as illustrated in FIG. 16 (e.g., (b) and (d) of FIG. 16). In one example, the size of SCI1 in time domain is 2 or 3 symbols. In one example, the size of SCI1 in time domain is (pre-)configured, e.g., parameter sl-TimeResourcePSCCH in SL-PSCCH_Config configures the number of symbols of PSCCH in a resource pool. In one example, the size of SCI1+SCI2 in time domain is double the size of SCI1 in time domain.

In one example, the size of SCI2 is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) configured/updated L1 control signaling (e.g., through DCI by the network, or through SCI (e.g., first and/or second stage SCI) of another UE); and (6) the (pre-)configuration can be for a resource pool.

In one example, SCI1 is transmitted and multiplexed in PSCCH. In one example SCI2 is transmitted and multiplexed in PSSCH and there is no SL-SCH in PSSCH (PSSCH only includes SCI2 in this example). In one example, SCI2 is transmitted and multiplexed in PSSCH, and a SL-SCH SCH is also multiplexed in PSSCH, wherein the SL-SCH includes a MAC CE that replicates the information transmitted in SCI2. In one example, SCI2 is transmitted multiplexed in PSSCH, and a SL-SCH is also multiplexed in PSSCH, wherein the SL-SCH includes a MAC CE that replicates the information transmitted in SCI2, and SL-SCH can include other SL data.

In one example, the control information associated with the reference signal for SL positioning measurements includes one stage of control information. In the following examples, the reference signal for SL positioning measurements is referred to as sidelink positioning reference signal (S-PRS).

In one example, the SL control information associated with S-PRS is transmitted in or multiplexed in a PSCCH.

In one example, the SL control information associated with S-PRS is transmitted in or multiplexed in a PSSCH. In a variant of this example, the PSSCH has an associated PSCCH that includes SCI format 1-A used to schedule the PSSCH.

In one example, the SL control information associated with S-PRS is transmitted in or multiplexed in a PSSCH. The SL control information associated with S-PRS is also transmitted in a SL-SCH, wherein the SL-SCH is transmitted in a PSSCH. For example, the SL control information associated with S-PRS can be included in a MAC CE, wherein the MAC CE is included in the SL-SCH. In a variant of this example, the PSSCH has an associated PSCCH that includes SCI format 1-A used to schedule the PSSCH.

In one example, the SL control information associated with S-PRS is transmitted in or multiplexed in a SL-SCH, wherein the SL-SCH is transmitted in a PSSCH. For example, the SL control information associated with S-PRS can be included in a MAC CE, wherein the MAC CE is included in the SL-SCH. In a variant of this example, the PSSCH has an associated PSCCH that includes SCI format 1-A used to schedule the PSSCH.

In one example, the SL control information associated with S-PRS is transmitted in or multiplexed in a new physical channel designed for conveying the first stage (or first part) control information associated with the reference signal for SL positioning measurements. In a variant of this example, the new physical has an associated PSCCH that includes SCI format 1-A used to schedule the new physical channel.

In the following examples, the SL control information associated with S-PRS is denoted as SCI-P. The reference signal for SL positioning measurement (or SL positioning reference signal) is denoted as S-PRS.

In one example, SCI-P is time division multiplexed with S-PRS. In one example frequency span of SCI-P is different from the frequency span of S-PRS. In one example, the frequency span of SCI-P is less than the frequency span of S-PRS. This is illustrated in FIG. 17.

In one example, the frequency span of SCI-P is more than the frequency span of S-PRS. In one example, the frequency span of SCI-P is the same as the frequency span of S-PRS. This is illustrated in FIG. 18. In one example, there is a gap symbol after the last symbol of S-PRS, as illustrated in FIG. 17 (e.g., (a) and (b) of FIG. 17), and FIG. 18 (e.g., (a) and (b) of FIG. 18).

Figure 17:
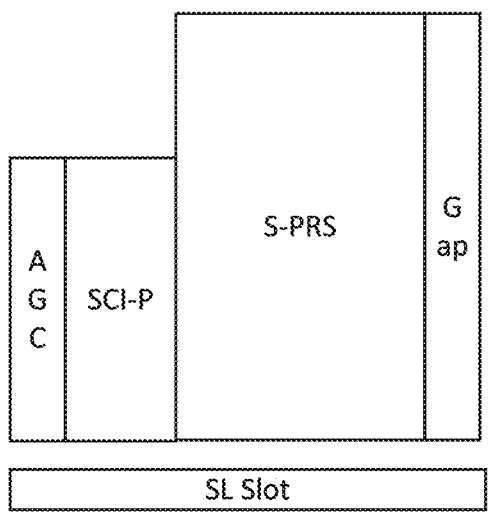
Figure 17:
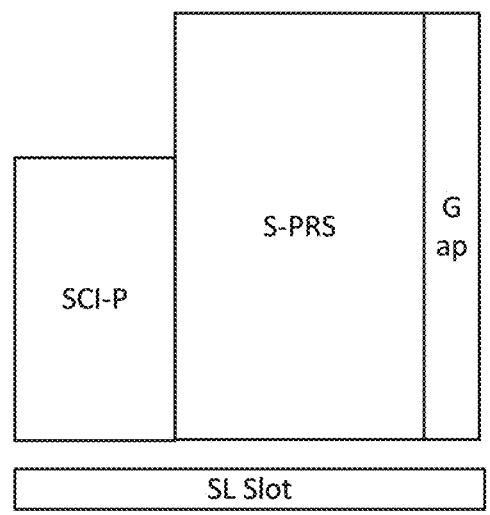
Figure 17:
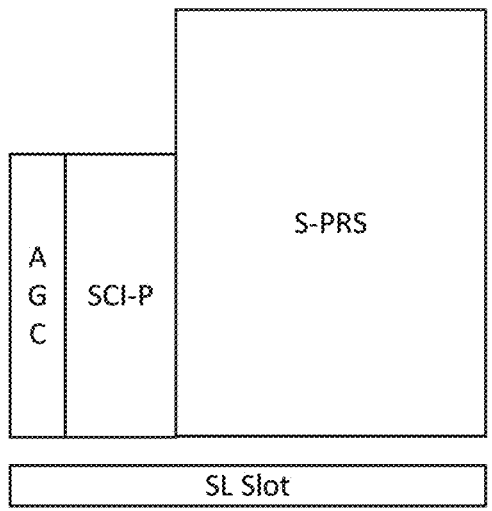
Figure 17:
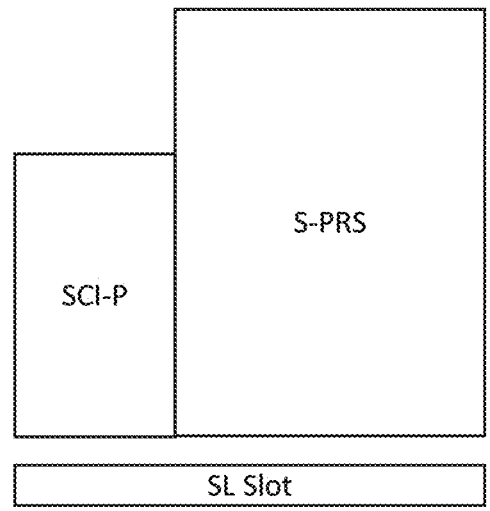
Figure 18:
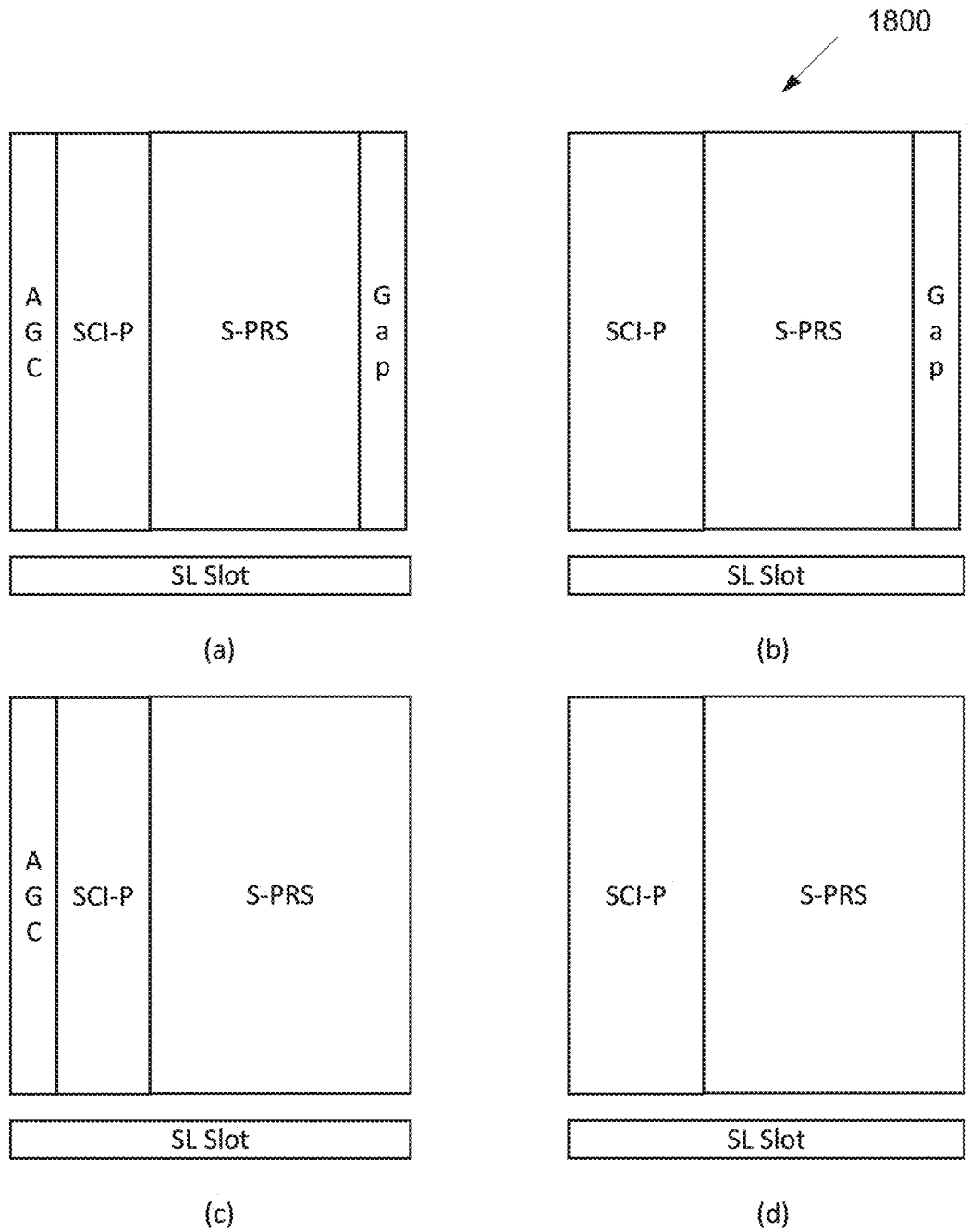

In one example, there is no gap symbol after the last symbol of S-PRS, as illustrated in FIG. 17 (e.g., (c) and (d) of FIG. 17), and FIG. 18 (e.g., (c) and (d) of FIG. 18). In one example, the first symbol of SCI-P is duplicated, this is denoted as AGC symbol, as illustrated in FIG. 17 (e.g., (a) and (c) of FIG. 17), and FIG. 18 (e.g. (a) and (c) of FIG. 18). In one example, the first symbol of SCI-P is not duplicated, as illustrated in FIG. 17 (e.g., (b) and (d) of FIG. 17), and FIG. 18 (e.g., (b) and (d) of FIG. 18). In one example, the size of SCI-P in time domain is 2 or 3 symbols. In one example, the size of SCI-P in time domain is the same as the size of SCI1 in time domain.

In one example, the size of SCI-P is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) Configured/updated L1 control signaling (e.g., through DCI by the network, or through SCI (e.g., first and/or second stage SCI or single stage SCI) of another UE); and (6) the (pre-)configuration can be for a resource pool.

In one example, SCI-P is transmitted and multiplexed in PSCCH. In one example SCI-P is transmitted and multiplexed in PSSCH and there is no SL-SCH in PSSCH (PSSCH only includes SCI-P in this example), wherein the PSSCH has an associated PSCCH that includes SCI format 1-A used to schedule the PSSCH. In one example, SCI-P is transmitted and multiplexed in PSSCH, and a SL-SCH is also multiplexed in PSSCH, wherein the SL-SCH includes a MAC CE that replicates the information transmitted in SCI-P, and wherein the PSSCH has an associated PSCCH that includes SCI format 1-A used to schedule the PSSCH. In one example, SCI-P is transmitted multiplexed in PSSCH, and a SL-SCH is also multiplexed in PSSCH, wherein the SL-SCH includes a MAC CE that replicates the information transmitted in SCI-P, and SL-SCH can include other SL data, and wherein the PSSCH has an associated PSCCH that includes SCI format 1-A used to schedule the PSSCH.

In one example, SCI-P is time division multiplexed with S-PRS. In one example the frequency span of SCI-P is different from the frequency span of S-PRS. In one example, the frequency span of SCI-P is less than the frequency span of S-PRS, and S-PRS is frequency division multiplexed with SCI-P to make the frequency span of symbols containing SCI-P the same as the frequency span of the S-PRS only symbols. This is illustrated in FIG. 19.

Figure 19:
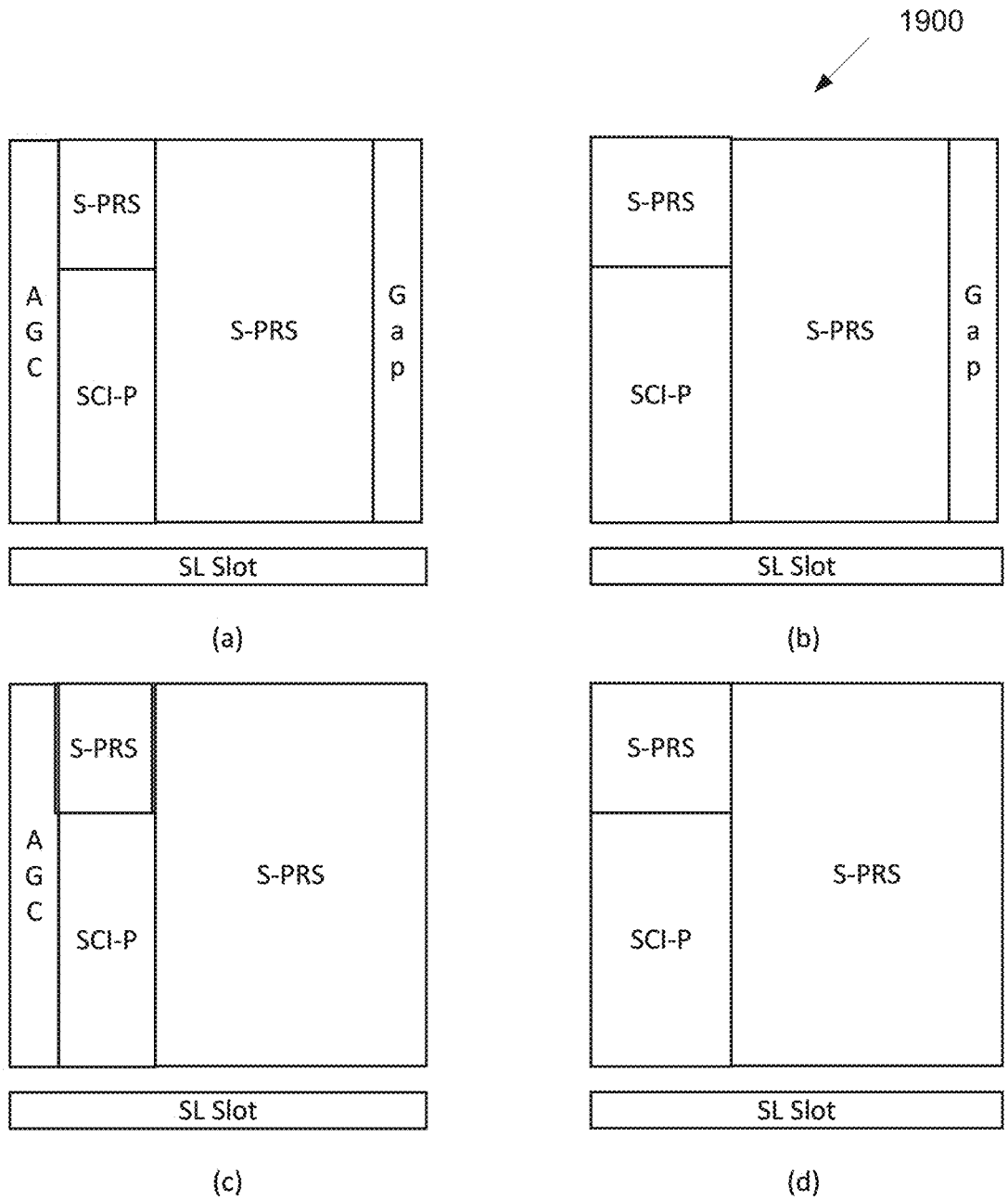

In one example, there is a gap symbol after the last symbol of S-PRS, as illustrated in FIG. 19 (e.g., (a) and (b) of FIG. 19). In one example, there is no gap symbol after the last symbol of S-PRS, as illustrated in FIG. 19 (e.g., (c) and (d) of FIG. 19). In one example, the first symbol of SCI-P is duplicated, this is denoted as AGC symbol, as illustrated in FIG. 19 (e.g., (a) and (c) of FIG. 19).

In one example, the first symbol of SCI-P is not duplicated, as illustrated in FIG. 19 (e.g., (b) and (d) of FIG. 19). In one example, the size of SCI-P in time domain is 2 or 3 symbols. In one example, the size of SCI-P in time domain is the same as the size of SCI1 in time domain.

In one example, the size of SCI-P is one or more of: (1) specified in the system specification. In one example, the value specified in the system specification is used if no other value is (pre-)configured; (2) pre-configured; (3) configured/updated by higher layer configuration (e.g., through Uu RRC interface by the network, or through PC5 RRC interface of another UE); (4) configured/updated by MAC CE signaling (e.g., through Uu MAC CE interface by the network, or through PC5 MAC CE interface of another UE); (5) configured/updated L1 control signaling (e.g., through DCI by the network, or through SCI (e.g., first and/or second stage SCI or single stage SCI) of another UE); and (6) the (pre-)configuration can be for a resource pool.

In one example, SCI-P is transmitted and multiplexed in PSCCH. In one example SCI-P is transmitted and multiplexed in PSSCH and there is no SL-SCH in PSSCH (PSSCH only includes SCI-P in this example), wherein the PSSCH has an associated PSCCH that includes SCI format 1-A used to schedule the PSSCH. In one example, SCI-P is transmitted and multiplexed in PSSCH, and a SL-SCH is also multiplexed in PSSCH, wherein the SL-SCH includes a MAC CE that replicates the information transmitted in SCI-P, and wherein the PSSCH has an associated PSCCH that includes SCI format 1-A used to schedule the PSSCH. In one example, SCI-P is transmitted multiplexed in PSSCH, and a SL-SCH is also multiplexed in PSSCH, wherein the SL-SCH includes a MAC CE that replicates the information transmitted in SCI-P, and SL-SCH can include other SL data, and wherein the PSSCH has an associated PSCCH that includes SCI format 1-A used to schedule the PSSCH.

In one example, the control information associated with the reference signal for SL positioning measurements is transmitted in a separate slot from the slot of the reference signal for SL positioning measurements. In the following examples, the reference signal for SL positioning measurements is referred to as a S-PRS.

In one example, the SL control information associated with S-PRS is transmitted in or multiplexed in a PSCCH.

In one example, the SL control information associated with S-PRS is transmitted in or multiplexed in a PSSCH. In a variant of this example, the PSSCH has an associated PSCCH that includes SCI format 1-A used to schedule the PSSCH.

In one example, the SL control information associated with S-PRS is transmitted in or multiplexed in a PSSCH. The SL control information associated with S-PRS is also transmitted in a SL-SCH, wherein the SL-SCH is transmitted in a PSSCH. For example, the SL control information associated with S-PRS can be included in a MAC CE, wherein the MAC CE is included in the SL-SCH. In a variant of this example, the PSSCH has an associated PSCCH that includes SCI format 1-A used to schedule the PSSCH.

In one example, the SL control information associated with S-PRS is transmitted in or multiplexed in a SL-SCH, wherein the SL-SCH is transmitted in a PSSCH. For example, the SL control information associated with S-PRS can be included in a MAC CE, wherein the MAC CE is included in the SL-SCH. In a variant of this example, the PSSCH has an associated PSCCH that includes SCI format 1-A used to schedule the PSSCH.

In one example, the SL control information associated with S-PRS is transmitted in or multiplexed in a new physical channel designed for conveying the first stage (or first part) control information associated with the reference signal for SL positioning measurements. In a variant of this example, the new physical has an associated PSCCH that includes SCI format 1-A used to schedule the new physical channel.

In the following examples, the SL control information associated with S-PRS is denoted as SCI-P. The reference signal for SL positioning measurement (or SL positioning reference signal) is denoted as S-PRS.

Figure 20:
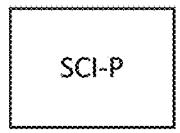
FIGS. 20-22 illustrate examples of SL control information in slot n and the associated S-PRS in slot m according to embodiments of the present disclosure.
Figure 20:
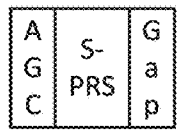
Figure 20:
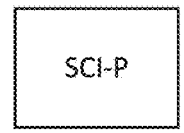
Figure 20:
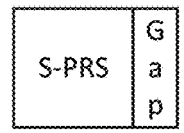
Figure 20:
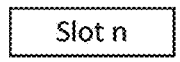
Figure 20:
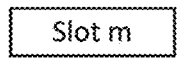
Figure 20:
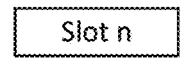
Figure 20:
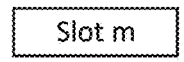
Figure 20:
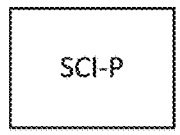
Figure 20:
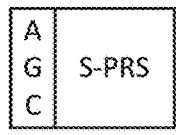
Figure 20:
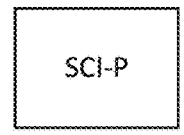
Figure 20:
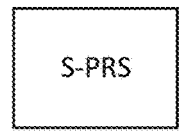
Figure 20:
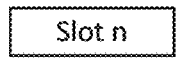
Figure 20:
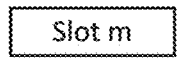
Figure 20:
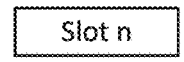
Figure 20:
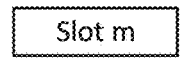
Figure 21:
Figure 21:
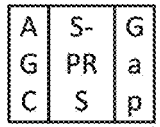
Figure 21:
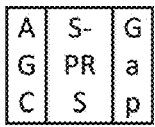
Figure 21:
Figure 21:
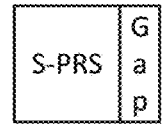
Figure 21:
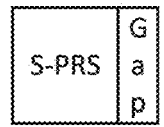
Figure 21:
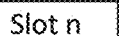
Figure 21:
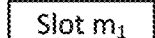
Figure 21:
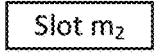
Figure 21:
Figure 21:
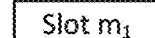
Figure 21:
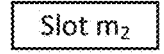
Figure 21:
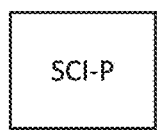
Figure 21:
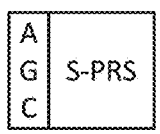
Figure 21:
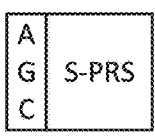
Figure 21:
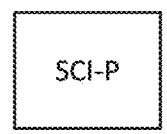
Figure 21:
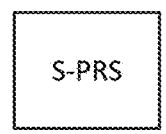
Figure 21:
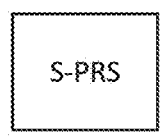
Figure 21:
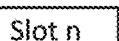
Figure 21:
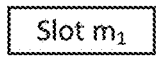
Figure 21:
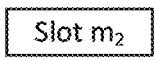
Figure 21:
Figure 21:
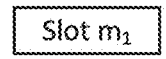
Figure 21:
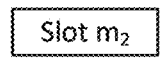
Figure 22:
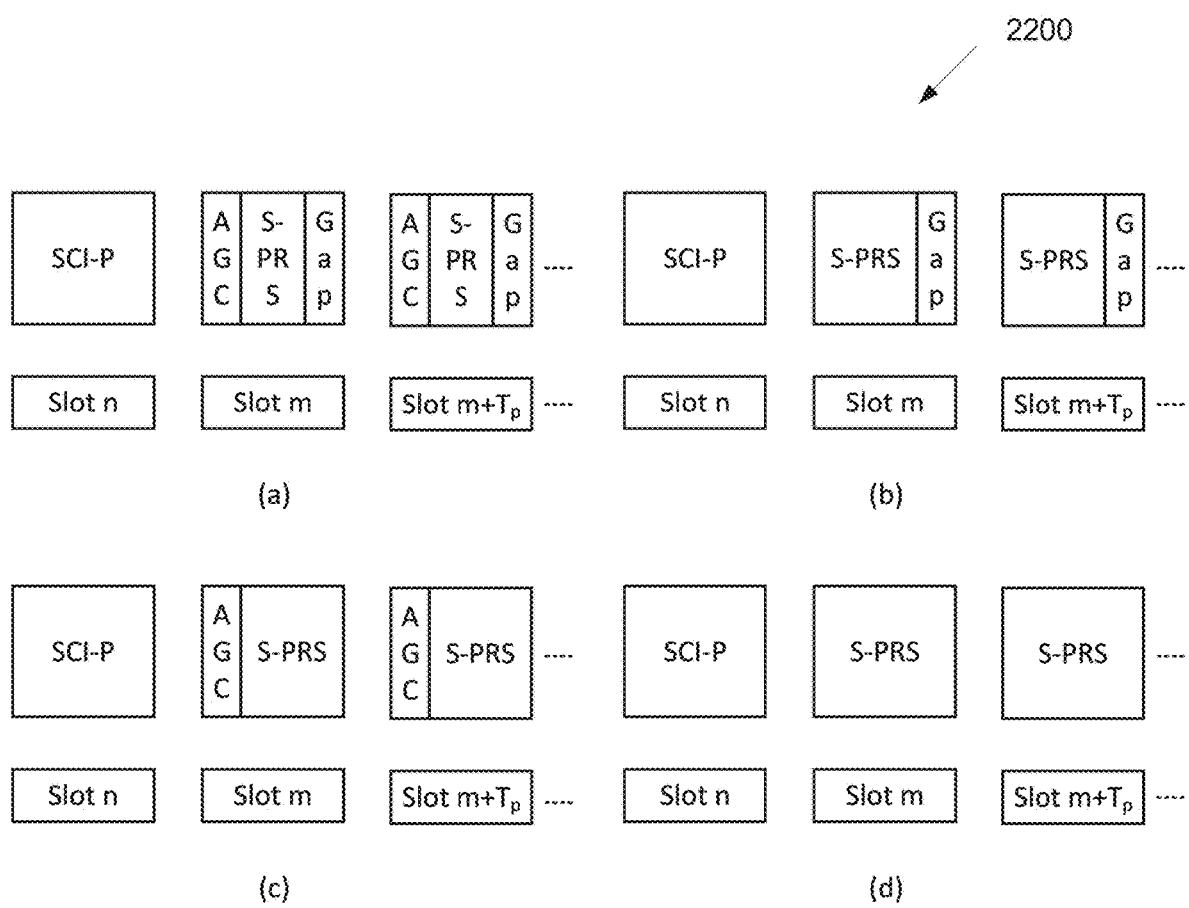

FIGS. 20-22 illustrate examples of SL control information in slot n and the associated S-PRS in slot m 2000 to 2200 according to embodiments of the present disclosure. Embodiments of the SL control information in slot n and the associated S-PRS in slot m 2000 to 2200 shown in FIG. 20-22 are for illustration only.

In one example, the SL control information is transmitted in slot n and the associated S-PRS is transmitted in slot m. The control information transmitted in slot n can indicate slot m, wherein slot m can be indicated as an offset from slot n or as a value of slot m. The offset can be in logical slots or in physical time as aforementioned. The value of slot m can be in logical slots or in physical slots as aforementioned. In one example, the offset can be specified in the system specifications and/or pre-configured and/or configured by RRC signaling and/or MAC CE signaling and/or L1 control signaling. In one example, there is a gap symbol after the last symbol of S-PRS, as illustrated in FIG. 20 (e.g., (a) and (b) of FIG. 20). In one example, there is no gap symbol after the last symbol of S-PRS, as illustrated in FIG. 20 (e.g., (c) and (d) of FIG. 20). In one example, the first symbol of S-PRS is duplicated, this is denoted as AGC symbol, as illustrated in FIG. 20 (e.g., (a) and (c) of FIG. 20). In one example, the first symbol of S-PRS is not duplicated, as illustrated in FIG. 20 (e.g., (b) and (d) of FIG. 20).

In one example, the SL control information is transmitted in slot n and the associated S-PRS is transmitted in slot $m_1$ and slot $m_2$. The control information transmitted in slot n can indicate slot $m_1$ and slot $m_2$, wherein slot $m_1$ and slot $m_2$ can be indicated as an offset from slot n or as a value of slot $m_1$ and slot $m_2$. The offset can be in logical slots or in physical time as aforementioned. The value of slot $m_1$ and slot $m_2$ can be in logical slots or in physical slots as aforementioned. In one example, the offset can be specified in the system specifications and/or pre-configured and/or configured by RRC signaling and/or MAC CE signaling and/or L1 control signaling. In one example, there is a gap symbol after the last symbol of S-PRS, as illustrated in FIG. 21 (e.g., (a) and (b) of FIG. 21). In one example, there is no gap symbol after the last symbol of S-PRS, as illustrated in FIG. 21 (e.g., (c) and (d) of FIG. 21). In one example, the first symbol of S-PRS is duplicated, this is denoted as AGC symbol, as illustrated in FIG. 21 (e.g., (a) and (c) of FIG. 21). In one example, the first symbol of S-PRS is not duplicated, as illustrated in FIG. 21 (e.g., (b) and (d) of FIG. 21).

In one example, the SL control information is transmitted in slot n and the associated S-PRS is transmitted in slot m, slot $m+T_p$, slot $m+2T_p$, . . . . In one example, slot m is slot $n+T_p$. In one example, m is a physical slot in the resource pool. In one example $T_p$ is the periodicity in physical slots or physical time (e.g., milli-seconds). In one example, m is a logical slot that can be in the resource pool. In one example $T_p$ is the periodicity in logical slots that can be in the resource pool. In one example, m is a logical slot in the resource pool. In one example $T_p$ is the periodicity in logical slots that are in the resource pool. In one example $T_p$ can be signaled in SCI-P. In one example $T_p$ can be (pre-)configured for resource pool and/or for a user. In one example, if $T_p$ is a signaled in SCI-P, the signaled value overrides a (pre-)configured value if any. In one example, the control information transmitted in slot n can indicate slot m, wherein slot m can be indicated as an offset from slot n or as a value of slot m. The offset can be in logical slots or in physical time as aforementioned. The value of slot m can be in logical slots or in physical slots as aforementioned. In one example, the offset can be specified in the system specifications and/or pre-configured and/or configured by RRC signaling and/or MAC CE signaling and/or L1 control signaling.

In one example, there is a gap symbol after the last symbol of S-PRS, as illustrated in FIG. 20 (e.g., (a) and (b) of FIG. 20). In one example, there is no gap symbol after the last symbol of S-PRS, as illustrated in FIG. 20 (e.g., (c) and (d) of FIG. 20). In one example, the first symbol of S-PRS is duplicated, this is denoted as AGC symbol, as illustrated in FIG. 20 (e.g., (a) and (c) of FIG. 20). In one example, the first symbol of S-PRS is not duplicated, as illustrated in FIG. 20 (e.g., (b) and (d) of FIG. 20).

Figure 23:
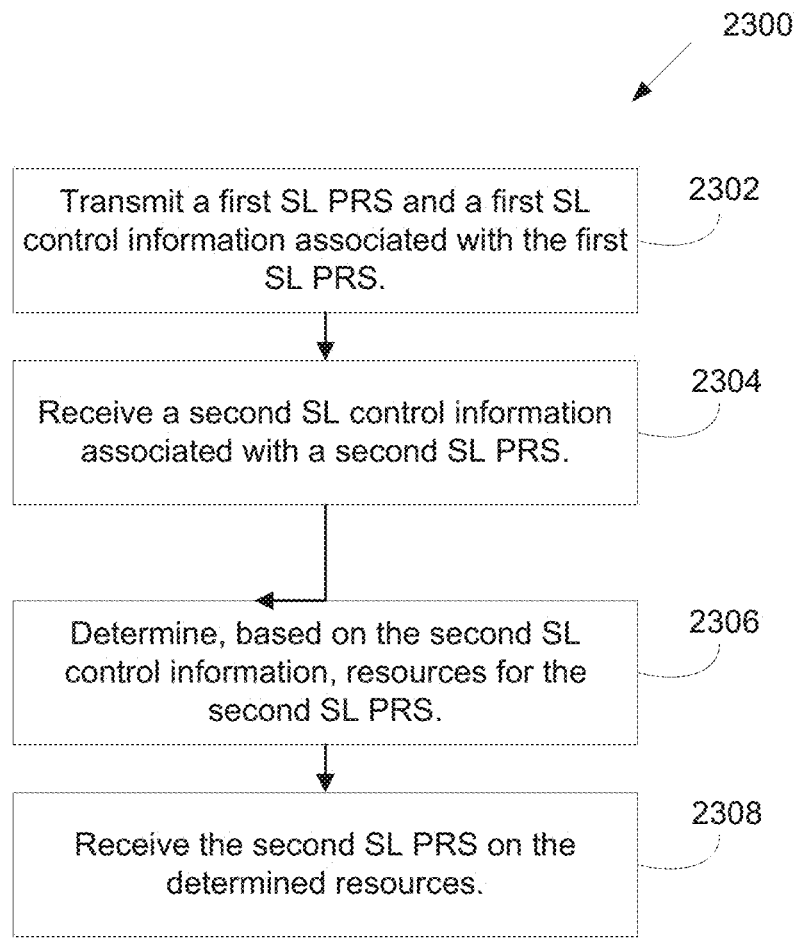
FIG. 23 illustrates an example of a method of operating a UE according to various embodiments of the present disclosure.

FIG. 23 illustrates an example of a method 2300 of operating a UE according to various embodiments of the present disclosure. For example, the method 2300 may be performed by a UE such as any of UEs 111-116. The method 2300 shown in FIG. 23 is for illustration only. Other embodiments of the method 2300 could be used without departing from the scope of the present disclosure.

The method begins with the UE transmitting, to another UE, a first SL PRS and a first SL control information associated with the first SL PRS (2302). For example, in 2302, the UE may receive configuration information from a network and transmit the first SL control information and the first SL PRS based on the configuration information.

The UE then receives, from the other UE, a second SL control information associated with a second SL PRS (2304) and determines, based on the second SL control information, resources for the second SL PRS (2306). Thereafter, the UE receives the second SL PRS on the determined resources (2308).

In various embodiments, each of the first SL control information and the second SL control information includes a first stage SCI format and a second stage SCI format. In various embodiments, the first SL control information and the second SL control information are in a same slot as the first SL PRS and the second SL PRS, respectively, and the first stage SCI format and the second stage SCI format are time division multiplexed.

In various embodiments, the first SL control information and the second SL control information are in same slots as the first SL PRS and the SL second PRS, respectively, and the first stage SCI format and the second stage SCI format are frequency division multiplexed. In one example, a combined frequency span of the first stage SCI format and the second stage SCI format is the same as a frequency span of the first or second SL PRS.

In various embodiments, the UE may receive configuration information configuring a number of symbols for the first SL control information and the second SL control information, where the number of symbols is 2 or 3 symbols excluding a duplicate symbol.

In various embodiments, the first SL control information and the first SL PRS are in different slots, the second SL control information and the second SL PRS are in different slots, and the first SL control information and the second SL control information indicate slots of the first SL PRS and the second SL PRS, respectively.

In various embodiments, the first SL control information and the first SL PRS are in different slots, the second SL control information and the second SL PRS are in different slots, the first SL control information and the second SL control information indicate slots of the first SL PRS and the second SL PRS, respectively, and periodicities for subsequent SL PRS slots, respectively, and the periodicities are in logical slots of a SL resource pool.

In various embodiments, the first SL PRS or the second SL PRS in a slot includes duplicate symbol of a starting symbol of the first or second SL PRS and a gap symbol with no transmission after the first or second SL PRS.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A first user equipment (UE) comprising:
   a processor; and
   a transceiver operably coupled with the processor, the transceiver configured to:
   receive, from a base station, first configuration information on a sidelink (SL) positioning reference signal (PRS) resource pool and second configuration information for a measurement report for a SL PRS,
   transmit, to a second UE, SL control information (SCI) and the SL PRS based on the first configuration information, and
   receive, from the second UE, the measurement report for the SL PRS based on the second configuration information,
   wherein the SCI and the SL PRS are transmitted in a same slot.

2. The first UE of claim 1, wherein the SCI includes a first stage SCI and a second stage SCI,
   wherein the first stage SCI for scheduling of a physical sidelink shared channel (PSSCH) is transmitted on a physical sidelink control channel (PSCCH), and
   wherein the second stage SCI for decoding of the PSSCH and scheduling of the SL PRS is transmitted on the PSSCH.

3. The first UE of claim 2, wherein the SL PRS is not transmitted in symbols associated with the first stage SCI, and
   wherein the SL PRS is transmitted after a last symbol of the second stage SCI.

4. The first UE of claim 2, wherein a frequency domain resource assignment of a SL PRS resource is the same as the PSSCH in the same slot.

5. The first UE of claim 1, wherein the SL PRS is not transmitted in a same symbol associated with the SCI.

6. The first UE of claim 1, wherein a frequency domain resource assignment of a SL PRS resource is different from a frequency domain resource assignment of the SCI in the same slots.

7. The first UE of claim 1, wherein a number of symbols and a number of physical resource blocks (PRBs) in the PRS resource pool is configured by higher layer signaling, and
   wherein a SL transmission including the SCI and the SL PRS starts from a second symbol in the same slot.

8. The first UE of claim 1, wherein the measurement report includes at least one of a SL Rx-Tx time difference (SL RSTD), a SL PRS reference signal received path power (RSRPP), a SL PRS reference signal received power (RSRP), or a SL angle of arrival (AoA).

9. A method of operating a first user equipment (UE), the method comprising:
   receiving, from a base station, first configuration information on a sidelink (SL) positioning reference signal (PRS) resource pool and second configuration information for a measurement report for a SL PRS;
   transmitting, to a second UE, SL control information (SCI) and the SL PRS based on the first configuration information; and
   receiving, from the second UE, the measurement report for the SL PRS based on the second configuration information,
   wherein the SCI and the SL PRS are transmitted in a same slot.

10. The method of claim 9, wherein the SCI includes a first stage SCI and a second stage SCI,
    wherein the first stage SCI for scheduling of a physical sidelink shared channel (PSSCH) is transmitted on a physical sidelink control channel (PSCCH), and
    wherein the second stage SCI for decoding of the PSSCH and scheduling of the SL PRS is transmitted on the PSSCH.

11. The method of claim 10, wherein the SL PRS is not transmitted in symbols associated with the first stage SCI, and
    wherein the SL PRS is transmitted after a last symbol of the second stage SCI.

12. The method of claim 10, wherein a frequency domain resource assignment of a SL PRS resource is the same as the PSSCH in the same slot.

13. The method of claim 9, wherein the SL PRS is not transmitted in a same symbol associated with the SCI.

14. The method of claim 9, wherein a frequency domain resource assignment of a SL PRS resource is different from a frequency domain resource assignment of the SCI in the same slot.

15. The method of claim 9, wherein a number of symbols and a number of physical resource blocks (PRBs) in the PRS resource pool is configured by higher layer signaling, and
   wherein a SL transmission including the SCI and the SL PRS starts from a second symbol in the same slot.

16. The method of claim 9, wherein the measurement report includes at least one of a SL Rx-Tx time difference (SL RSTD), a SL PRS reference signal receive path power (RSRPP), a SL PRS reference signal received power (RSRP), or a SL angle of arrival (AoA).

* * * * *